US012728636B2

(12) United States Patent
Maeda et al.

(10) Patent No.: US 12,728,636 B2
(45) Date of Patent: Sep. 8, 2026

(54) PRINTING APPARATUS, METHOD, AND COMPUTER-READABLE STORAGE MEDIUM FOR MAINTAINING CONSISTENT QUALITY OF LIQUID EJECTION FROM NOZZLES

(71) Applicant: BROTHER KOGYO KABUSHIKI KAISHA, Nagoya (JP)

(72) Inventors: Atsushi Maeda, Nagoya (JP); Yuki Okumura, Iwakura (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 108 days.

(21) Appl. No.: 18/824,344

(22) Filed: Sep. 4, 2024

(65) Prior Publication Data

US 2025/0091343 A1 Mar. 20, 2025

(30) Foreign Application Priority Data

Sep. 19, 2023 (JP) ................................. 2023-151556

(51) Int. Cl.

*B41J 2/045* (2006.01)
*B41J 2/175* (2006.01)
*B41J 2/18* (2006.01)

(52) U.S. Cl.

CPC ....... *B41J 2/04588* (2013.01); *B41J 2/04541* (2013.01); *B41J 2/0455* (2013.01); *B41J 2/04581* (2013.01); *B41J 2/17596* (2013.01); *B41J 2/18* (2013.01)

(58) Field of Classification Search

CPC .. B41J 2/04588; B41J 2/04541; B41J 2/0455; B41J 2/04581; B41J 2/17596; B41J 2/18; B41J 2202/12; B41J 2/04551; B41J 2/04563; B41J 2/14233

See application file for complete search history.

(56) References Cited

U.S. PATENT DOCUMENTS 5,867,200 A 2/1999 Tajima et al.
2022/0314617 A1* 10/2022 Hiwada ................ B41J 2/04588

FOREIGN PATENT DOCUMENTS

JP S58-53784 Y2 12/1983
JP H8-118645 A 5/1996
JP 2010-142978 A 7/2010
JP S58-53784 B2 2/2016

* cited by examiner

*Primary Examiner* — Lisa Solomon
(74) *Attorney, Agent, or Firm* — Merchant & Gould P.C.

(57) ABSTRACT

A printing apparatus includes a controller including a multiplexing circuit and a separation circuit. The multiplexing circuit generates a time division multiplex signal based on first data representing a first drive waveform and second data representing a second drive waveform. The separation circuit includes a switch to separate a first drive waveform signal indicating the first drive waveform or a second drive waveform signal indicating the second drive waveform from the time division multiplex signal based on a synchronization signal. The controller causes the switch to separate the first drive waveform signal from the time division multiplex signal to drive an actuator to cause a nozzle to eject liquid, and causes the switch to separate the second drive waveform signal from the time division multiplex signal to drive the actuator without causing the nozzle to eject the liquid, thereby increasing a temperature of the separation circuit.

20 Claims, 34 Drawing Sheets

551

| TIME SLOT NUMBER | ALLOCATION DATA |
|---|---|
| a1 | [A0] |
| a2 | [B0] |
| a3 | [C0] |
| a4 | [A1] |
| a5 | [B1] |
| a6 | [C1] |
| • | • |
| • | • |
| • | • |
| • | • |
| • | • |

FIG. 6

552

| Ink Name | Resin Particle | Organic Solvent Having Saturated Vapor Pressure of 0.03 hPa or Higher | Colorant Solid Content | Average Pigment Particle Size | Water |
|---|---|---|---|---|---|
| Ink A | 2 % | 7 % | 1 % | 60 nm | 85 % |
| Ink B | 0.5 % | 15 % | 1 % | 60 nm | 75 % |
| Ink C | 0.5 % | 7 % | 5 % | 60 nm | 85 % |
| Ink D | 0.5 % | 7 % | 1 % | 170 nm | 85 % |
| Ink E | 0.5 % | 7 % | 1 % | 60 nm | 50 % |
| Ink F | 2 % | 15 % | 1 % | 60 nm | 75 % |
| Ink G | 0.5 % | 7 % | 5 % | 170 nm | 50 % |
| Ink H | 0.5 % | 7 % | 1 % | 60 nm | 85 % |
| • | • | • | • | • | • |
| • | • | • | • | • | • |
| • | • | • | • | • | • |

FIG. 15

553

| Condition Item | Condition Range |
|---|---|
| Resin Particle | 1 ≤ (mass%) ≤ 10 |
| Organic Solvent Having Saturated Vapor Pressure of 0.03 hPa or Higher | 10 ≤ (mass%) ≤ 30 |
| Colorant Solid Content | 2 ≤ (mass%) ≤ 10 |
| Average Pigment Particle Size | size (nm) ≥ 150 |
| Water | (mass%) ≤ 60 |

FIG. 16

554

| Score | Resin Particle | Organic Solvent Having Saturated Vapor Pressure of 0.03 hPa or Higher | Colorant Solid Content | Average Pigment Particle Size | Water |
|---|---|---|---|---|---|
| 3 | (mass%) < 1 | (mass%) < 10 | (mass%) < 2 | size (nm) < 80 | (mass%) ≥ 80 |
| 2 | 1 ≤ (mass%) < 4 | 10 ≤ (mass%) < 20 | 2 ≤ (mass%) < 4 | 80 ≤ size (nm) < 110 | 70 ≤ (mass%) < 80 |
| 1 | 4 ≤ (mass%) < 7 | 20 ≤ (mass%) < 25 | 4 ≤ (mass%) < 7 | 110 ≤ size (nm) < 150 | 60 ≤ (mass%) < 70 |
| 0 | (mass%) ≥ 7 | (mass%) ≥ 25 | (mass%) ≥ 7 | size (nm) ≥ 150 | (mass%) < 60 |

FIG. 21

555

| TEMPERATURE INCREASE NECESSITY DEGREE | NUMBER OF SWITCHES |
|---|---|
| 12 - 15 | 3 |
| 8 - 11 | 2 |
| 4 - 7 | 1 |
| 0 - 3 | 0 |

FIG. 22

DRIVE WAVEFORM D

DRIVE WAVEFORM E

551

| TIME SLOT NUMBER | ALLOCATION DATA |
|---|---|
| a1 | [A0] |
| a2 | [D0] |
| a3 | [E0] |
| a4 | [A1] |
| a5 | [D1] |
| a6 | [E1] |
| • | • |
| • | • |
| • | • |
| • | • |
| • | • |

FIG. 27

DRIVE WAVEFORM D1

DRIVE WAVEFORM E1

556

| Ink Name | Specific Heat | Properties |
|---|---|---|
| Ink I | 4.50 J/(g·K) | 1st Properties |
| Ink J | 3.50 J/(g·K) | 2nd Properties |
| Ink K | 5.00 J/(g·K) | 1st Properties |
| Ink L | 3.00 J/(g·K) | 2nd Properties |
| • | • | • |
| • | • | • |
| • | • | • |

FIG. 31

PRINTING APPARATUS, METHOD, AND COMPUTER-READABLE STORAGE MEDIUM FOR MAINTAINING CONSISTENT QUALITY OF LIQUID EJECTION FROM NOZZLES

REFERENCE TO RELATED APPLICATIONS

This application claims priority from Japanese Patent Application No. 2023-151556 filed on Sep. 19, 2023. The entire content of the priority application is incorporated herein by reference.

BACKGROUND ART

Heretofore, devices to form an image by ejecting fluid from a head onto a medium have been used. For instance, a fluid ejection device has been known that is configured to eject fluid (e.g., ink) from each nozzle by applying a selected one of a plurality of drive pulses to a corresponding piezoelectric element at appropriate timing.

SUMMARY

A resistance value of a switch for selecting a drive pulse (from among the plurality of drive pulses included in a drive waveform signal) when the switch is turned on varies with temperature. If the resistance value of the switch varies when fluid (liquid) is ejected from a nozzle, the quality of liquid ejection from the nozzle may vary.

Aspects of the present disclosure are advantageous for providing one or more improved techniques that make it possible for a printing apparatus to maintain the quality of liquid ejection from nozzles at a constant level.

According to aspects of the present disclosure, a printing apparatus is provided, which includes a print head and a controller. The print head includes a nozzle and an actuator. The print head is configured to eject liquid from the nozzle when the actuator is driven by a drive signal. The controller includes a multiplexing circuit and a separation circuit. The multiplexing circuit is configured to generate a time division multiplex signal based on first data and second data. The time division multiplex signal enables the first data and the second data to be transmitted via a single signal line. The first data represents a first drive waveform. The first drive waveform has a first section and a second section. The second data represents a second drive waveform different from the first drive waveform. The second drive waveform has a third section and a fourth section. The time division multiplex signal is generated with the first to fourth sections arranged in such a manner that the third section is between the first section and the second section, and the second section is between the third section and the fourth section. The separation circuit is configured to receive the time division multiplex signal from the multiplexing circuit. The separation circuit includes one or more switches configured to separate a first drive waveform signal or a second drive waveform signal from the time division multiplex signal based on a synchronization signal. The first drive waveform signal indicates the first drive waveform. The second drive waveform signal indicates the second drive waveform. The controller is configured to cause the one or more switches to separate the first drive waveform signal from the time division multiplex signal, and drive the actuator to cause the nozzle to eject the liquid based on the first drive waveform signal. The controller is further configured to cause the one or more switches to separate the second drive waveform signal from the time division multiplex signal, and drive the actuator without causing the nozzle to eject the liquid based on the second drive waveform signal, thereby increasing a temperature of the separation circuit.

According to aspects of the present disclosure, further provided is a method implementable on a controller of a printing apparatus. The printing apparatus includes a print head including a nozzle and an actuator, a multiplexing circuit, and a separation circuit including one or more switches. The method includes causing the one or more switches to separate a first drive waveform signal from a time division multiplex signal generated by the multiplexing circuit, and drive the actuator to cause the nozzle to eject liquid based on the first drive waveform signal. The method further includes causing the one or more switches to separate a second drive waveform signal from the time division multiplex signal, and drive the actuator without causing the nozzle to eject the liquid based on the second drive waveform signal, thereby increasing a temperature of the separation circuit. The multiplexing circuit is configured to generate the time division multiplex signal based on first data and second data. The time division multiplex signal enables the first data and the second data to be transmitted via a single signal line. The first data represents a first drive waveform. The first drive waveform has a first section and a second section. The second data represents a second drive waveform different from the first drive waveform. The second drive waveform has a third section and a fourth section. The time division multiplex signal is generated with the first to fourth sections arranged in such a manner that the third section is between the first section and the second section, and the second section is between the third section and the fourth section. The separation circuit is configured to receive the time division multiplex signal from the multiplexing circuit. The separation circuit includes the one or more switches configured to separate the first drive waveform signal or the second drive waveform signal from the time division multiplex signal based on a synchronization signal. The first drive waveform signal indicates the first drive waveform. The second drive waveform signal indicates the second drive waveform.

According to aspects of the present disclosure, further provided is a non-transitory computer-readable storage medium storing computer-readable instructions that are executable by a controller of a printing apparatus. The printing apparatus includes a print head including a nozzle and an actuator, a multiplexing circuit, and a separation circuit including one or more switches. The instructions are configured to, when executed by the controller, cause the printing apparatus to cause the one or more switches to separate a first drive waveform signal from a time division multiplex signal generated by the multiplexing circuit, and drive the actuator to cause the nozzle to eject liquid based on the first drive waveform signal. The instructions are further configured to, when executed by the controller, cause the printing apparatus to cause the one or more switches to separate a second drive waveform signal from the time division multiplex signal, and drive the actuator without causing the nozzle to eject the liquid based on the second drive waveform signal, thereby increasing a temperature of the separation circuit. The multiplexing circuit is configured to generate the time division multiplex signal based on first data and second data. The time division multiplex signal enables the first data and the second data to be transmitted via a single signal line. The first data represents a first drive waveform. The first drive waveform has a first section and a second section. The second data represents a second drive waveform different from the first drive waveform. The second drive waveform has a third section and a fourth section. The time division multiplex signal is generated with the first to fourth sections arranged in such a manner that the third section is between the first section and the second section, and the second section is between the third section and the fourth section. The separation circuit is configured to receive the time division multiplex signal from the multiplexing circuit. The separation circuit includes the one or more switches configured to separate the first drive waveform signal or the second drive waveform signal from the time division multiplex signal based on a synchronization signal. The first drive waveform signal indicates the first drive waveform. The second drive waveform signal indicates the second drive waveform.

BRIEF DESCRIPTION OF DRAWINGS

FIG. 6 shows an example of a mapping information table.

FIG. 15 shows an example of an ink table.

FIG. 16 shows an example of a specific ink condition table.

FIG. 21 shows an example of a temperature increase score table.

FIG. 22 shows an example of a temperature increase degree table.

FIG. 27 shows an example of a mapping information table.

FIG. 31 shows an example of an ink properties table.

DESCRIPTION

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storage, hard disk drives, floppy drives, permanent storage, and the like.

First Illustrative Embodiment

Figure 1:
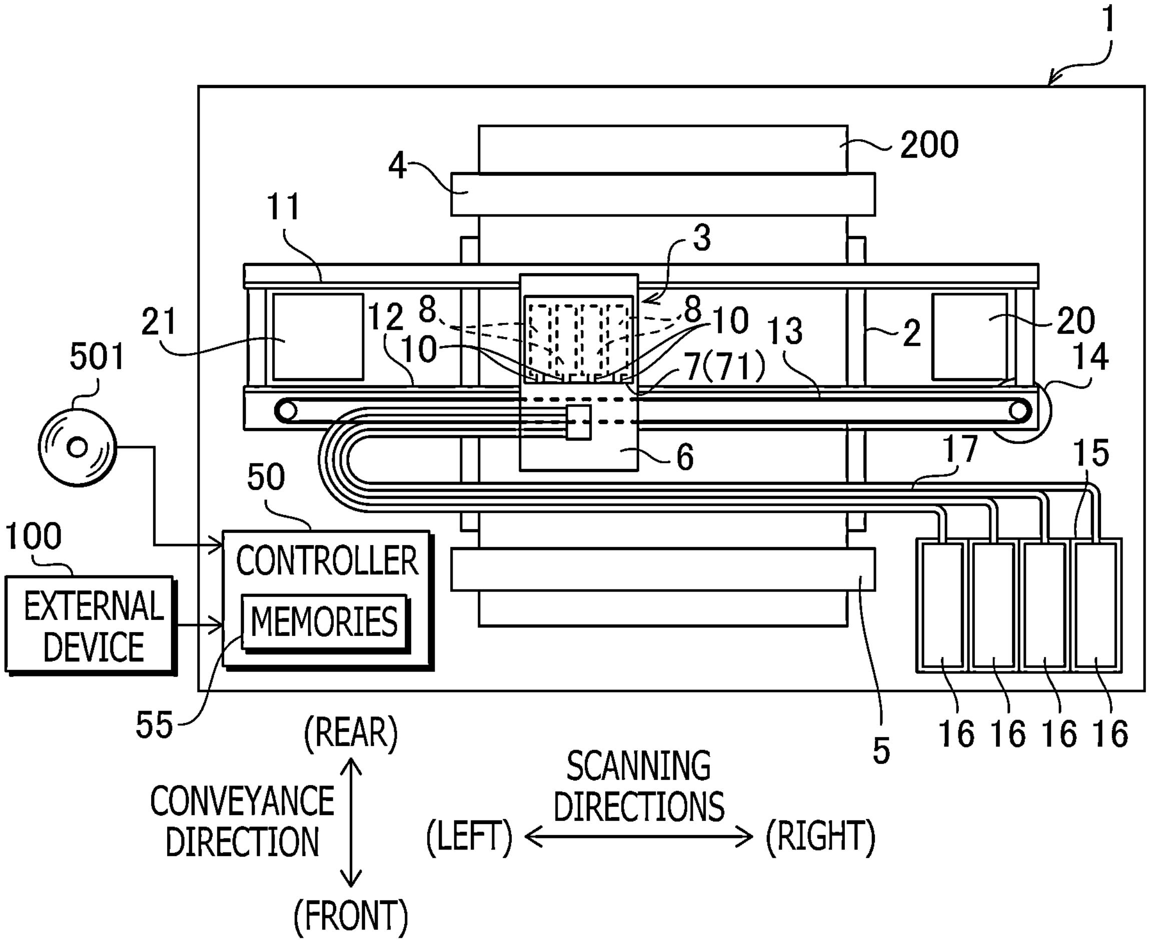
FIG. 1 is a plan view schematically showing a configuration of a printing apparatus.

Hereinafter, a printing apparatus 1 in a first illustrative embodiment according to aspects of the present disclosure will be described with reference to the accompanying drawings. FIG. 1 is a plan view schematically showing a configuration of the printing apparatus 1. In the following description, a front side, a rear side, a left side, and a right side of the printing apparatus 1 are defined as shown in FIG. 1. A conveyance direction is along front-rear directions (i.e., a frontward direction and a rearward direction). Scanning directions are along left-right directions (i.e., a leftward direction and a rightward direction). Further, in the following description, an upper side and a lower side of the printing apparatus 1 are defined as follows. A front face and a back face of a plane (sheet) on which FIG. 1 is drawn correspond to the upper side and the lower side of the printing apparatus 1, respectively.

As shown in FIG. 1, the printing apparatus 1 includes a platen 2, an ink ejector 3, and conveyance rollers 4 and 5. On an upper surface of the platen 2, a recording sheet 200, which is a recording medium, is placed. The ink ejector 3 is configured to eject ink onto the recording sheet 200 placed on the platen 2, thereby recording an image on the recording sheet 200. The ink ejector 3 includes a carriage 6, a sub tank 7, four inkjet heads 8, and a circulation pump 10.

On an upper side of the platen 2, there are two guide rails 11 and 12 extending along the left-right directions. The guide rails 11 and 12 are configured to guide the carriage 6. The carriage 6 is connected with an endless belt 13 extending along the left-right directions. The endless belt 13 is driven by a carriage drive motor 14. When the endless belt 13 is driven, the carriage 6 is guided by the guide rails 11 and 12 and reciprocated along the scanning directions in a region opposed to the platen 2. More specifically, the carriage 6 performs, while supporting the four inkjet heads 8, a first movement to move the four inkjet heads 8 rightward along the scanning directions from a first position to a second position, and a second movement to move the four inkjet heads 8 leftward along the scanning directions from the second position to the first position.

A cap 20 and a flushing receptacle 21 are disposed between the guide rails 11 and 12. The cap 20 and the flushing receptacle 21 are located below the ink ejector 3. The cap 20 is located between right end portions of the guide rails 11 and 12. The flushing receptacle 21 is located between left end portions of the guide rails 11 and 12. The cap 20 and the flushing receptacle 21 may be disposed in respective positions reversed in the left-right directions.

The sub tank 7 and the four inkjet heads 8 are mounted on the carriage 6 and are enabled to reciprocate along the scanning directions with the carriage 6. The sub tank 7 is connected with a cartridge holder 15 via a tube 17. One or more ink cartridges 16 for one or more colors (e.g., four colors in the first illustrative embodiment) are attached to the cartridge holder 15. Practicable examples of the four colors may include, but are not limited to, black, yellow, cyan and magenta.

Four ink chambers (liquid chambers) 71 are formed inside the sub tank 7. The four ink chambers 71 are configured to store ink of the four colors supplied from the four ink cartridges 16, respectively.

The four inkjet heads 8 are arranged along the scanning directions below the sub tank 7. A plurality of nozzles 80 (see FIG. 2) are formed in a lower surface of each inkjet head 8. Each of the four inkjet heads 8 is associated with a corresponding one of the four colors and connected with a corresponding one of the four ink chambers 71. Namely, the four inkjet heads 8 are associated with the four ink colors and connected with the four ink chambers 71, respectively.

Each inkjet head 8 has an ink supply port and an ink discharge port. The ink supply port and the ink discharge port are connected with a corresponding ink chamber 71 via tubes, thereby forming a circulation path. The circulation pump 10 is interposed between the ink supply port and the ink chamber 71.

Ink delivered from the ink chamber 71 by the circulation pump 10 flows into the individual inkjet head 8 through the ink supply port and is ejected from the nozzles 80. Ink that has not been ejected from the nozzles 80 returns to the ink chamber 71 through the ink discharge port. The ink circulates between the ink chamber 71 and the inkjet head 8. Each of the four inkjet heads 8 is configured to eject ink of a corresponding one of the four colors that is supplied from the sub tank 7 onto the recording sheet 200 while moving along the scanning directions together with the carriage 6.

As shown in FIG. 1, the conveyance roller 4 is disposed upstream (rearward) of the platen 2 in the conveyance direction. The conveyance roller 5 is disposed downstream (frontward) of the platen 2 in the conveyance direction. The two conveyance rollers 4 and 5 are driven in synchronization with each other by a motor (not shown). The two conveyance rollers 4 and 5 are configured to convey the recording sheet 200 placed on the platen 2 in the conveyance direction orthogonal to the scanning directions. The printing apparatus 1 includes a controller 50. The controller 50 includes one or more processors such as a CPU and a logic circuit (e.g., FPGA), and one or more memories 55 such as a non-volatile memory and a RAM. For instance, the controller 50 is configured to perform various types of control processing by reading and executing a computer program (program product) stored in a portable recording medium 501. In another instance, the computer program to be read may be pre-installed in the one or more memories 55. In yet another instance, the computer program may be downloaded through a network (not shown) connected with a communication network (not shown) and stored in the one or more memories 55. In the present disclosure, at least one of the following processes by the controller 50 may be performed by the controller 50 executing the computer program. The controller 50 receives a print job and drive waveform data from an external device 100 and stores the print job and the drive waveform data in the one or more memories 55. Based on the print job, the controller 50 takes control of driving the ink ejector 3 and the conveyance roller 4, and performs a printing process.

Figure 2:
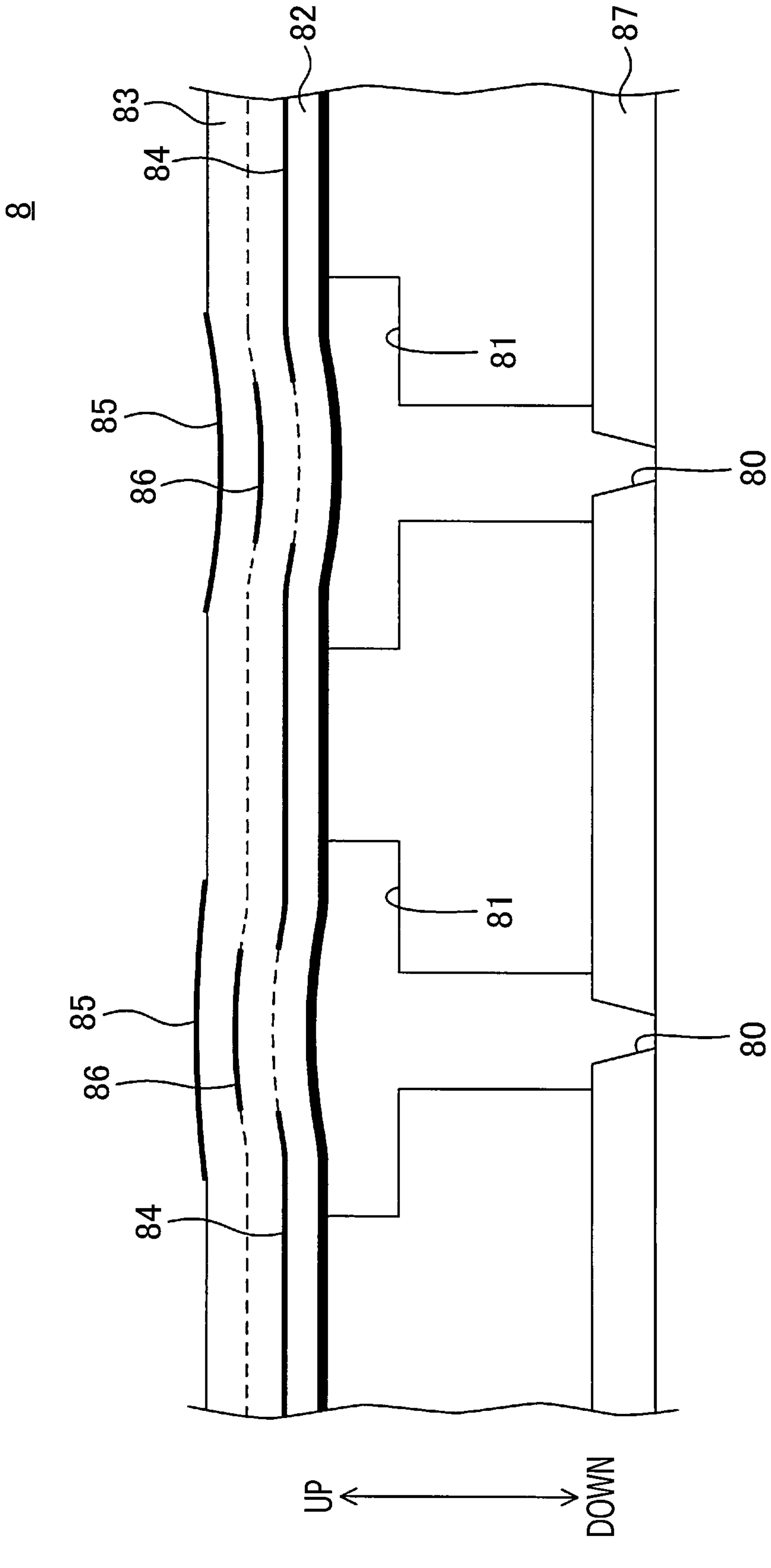
FIG. 2 is a partial enlarged cross-sectional schematically showing a configuration of an inkjet head of the printing apparatus.

FIG. 2 is a partial enlarged cross-sectional view schematically showing a configuration of an inkjet head 8. As shown in FIG. 2, each of the inkjet heads 8 has a plurality of pressure chambers 81. The plurality of pressure chambers 81 form a plurality of pressure chamber rows. A diaphragm 82 is formed above the pressure chambers 81. A layered piezoelectric body 83 is formed above the diaphragm 82. A first common electrode 84 is formed between the piezoelectric body 83 and the diaphragm 82, above the pressure chambers 81.

A second common electrode 86 is formed inside the piezoelectric body 83. The second common electrode 86 is disposed above the pressure chambers 81 and above the first common electrode 84. The second common electrode 86 is located in such a position as not to face the first common electrode 84 in the vertical direction. A plurality of individual electrodes 85, each of which is disposed above a corresponding one of the pressure chambers 81, are formed on an upper surface of the piezoelectric body 83. Each individual electrode 85 is opposed to the first common electrode 84 across the piezoelectric body 83 in the vertical direction. Further, each individual electrode 85 is opposed to the second common electrode 86 across the piezoelectric body 83 in the vertical direction. The diaphragm 82, the piezoelectric body 83, the first common electrode 84, the individual electrodes 85 and the second common electrode 86 form actuators 88.

A nozzle plate 87 is disposed below the pressure chambers 81. The nozzle plate 87 has a plurality of nozzles 80 formed to penetrate the nozzle plate vertically. Each nozzle 80 is disposed below a corresponding one of the pressure chambers 81. The plurality of nozzles 80 form a plurality of nozzle rows extending along the pressure chamber rows. Each nozzle 80 is configured to eject liquid when a corresponding actuator 88 is driven. It is noted that in the following description, "driving a nozzle 80" may be used as an expression having substantially the same meaning as "driving the actuator 88 for the nozzle 80."

The first common electrode 84 is connected with a COM terminal. For instance, in the first illustrative embodiment, the first common electrode 84 is connected with ground. The second common electrode 86 is connected with a VCOM terminal. The VCOM voltage is higher than the COM voltage. The individual electrodes 85 are connected with a switch group (isolation circuit) 54 (see FIG. 3). When a high voltage or a low voltage is applied to an individual electrode 85, the piezoelectric body is deformed, and the diaphragm 82 vibrates. The vibration of the diaphragm 82 causes ink to be ejected from a corresponding pressure chamber 81 through a corresponding nozzle 80.

Figure 3:
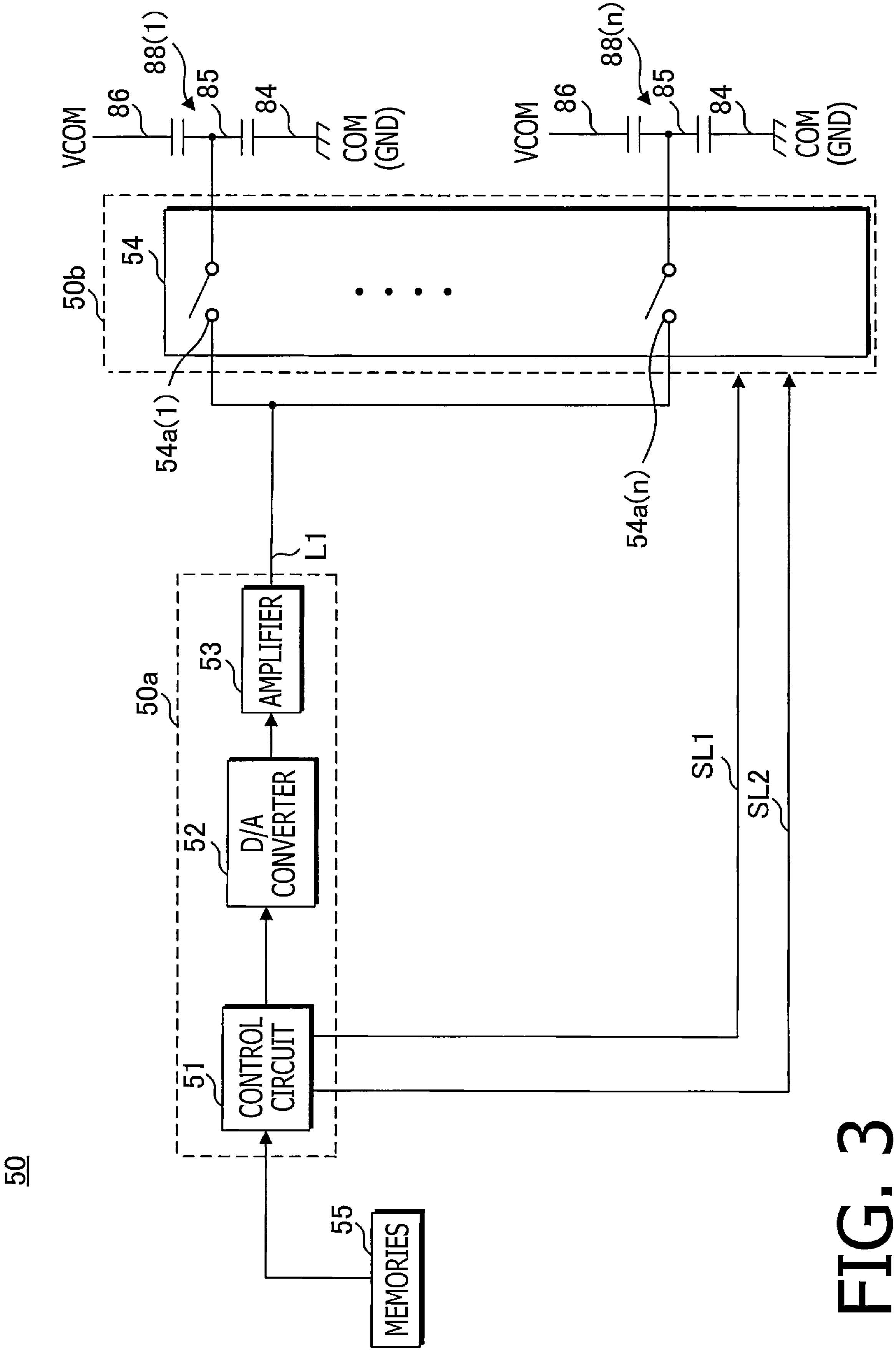
FIG. 3 is a block diagram showing an electrical configuration of a controller of the printing apparatus.
Figure 4:
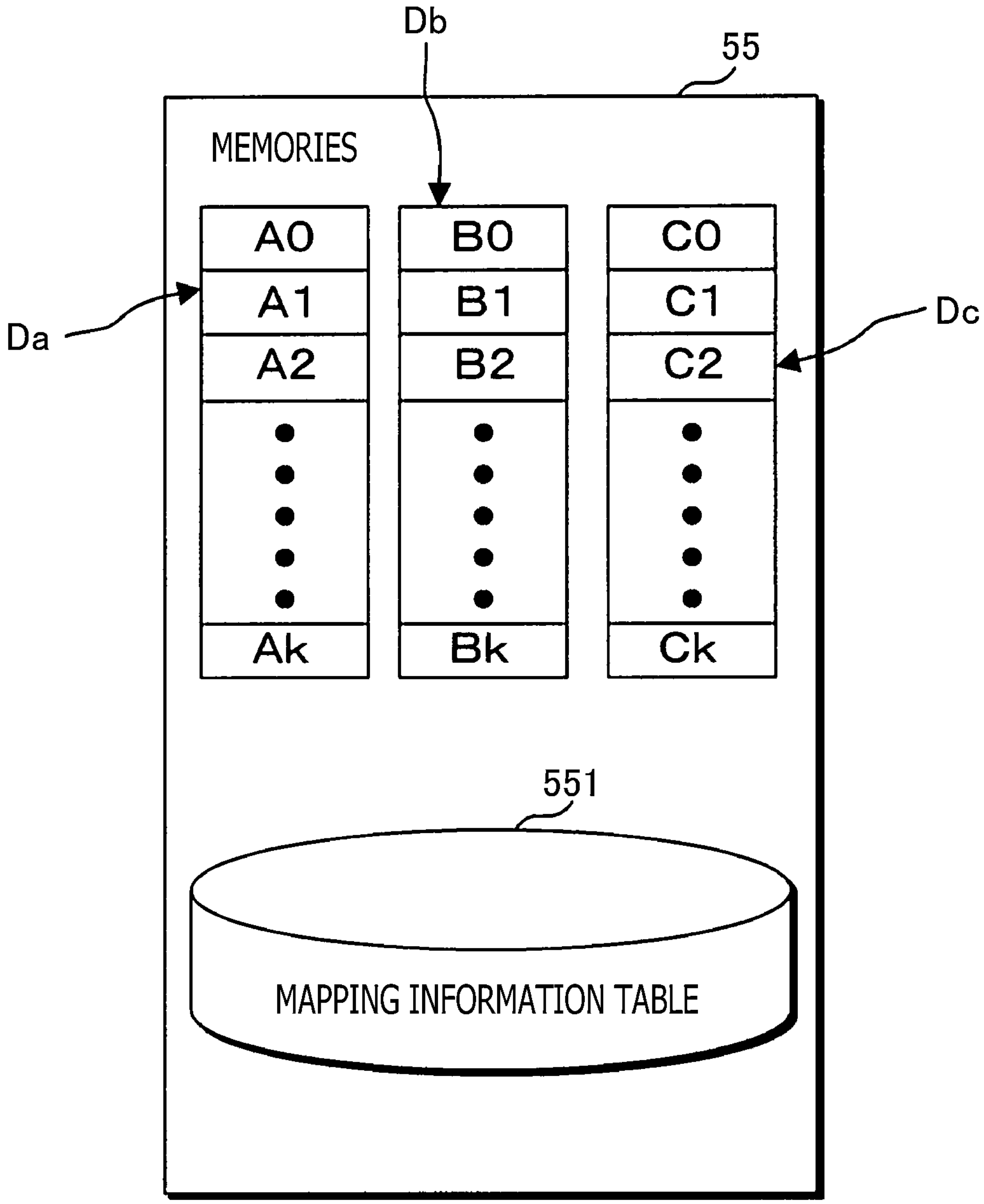
FIG. 4 is a block diagram showing drive waveform data and a table that are stored in one or more memories of the printing apparatus.

FIG. 3 is a block diagram showing an electrical configuration of the controller 50. FIG. 4 is a block diagram showing drive waveform data and a table stored in the one or more memories 55. The controller 50 has a control circuit 51, a D/A converter 52, an amplifier 53, the switch group 54, and the one or more memories 55. The switch group 54 is included in a separation circuit 50*b*. The one or more memories 55 store drive waveform data. The drive waveform data is quantized data that indicates voltage waveforms to be applied to the individual electrodes 85, i.e., drive waveforms for driving the actuators 88. In the first illustrative embodiment, the one or more memories 55 further store a plurality of pieces of drive waveform data Da to Dc (see FIG. 4). The one or more memories 55 further store a mapping information table 551. The mapping information will be described in detail later.

The D/A converter 52 is configured to convert digital signals into analog signals. The amplifier 53 is configured to amplify analog signals. The amplifier 53 is connected with the switch group 54 via a single signal line L1.

The switch group 54 includes a plurality of switches 54*a*. The plurality of switches 54*a* include a first switch 54*a*(1), a second switch 54*a*(2), . . . , and an n-th switch 54*a*(n).

One end of each of the plurality of switches 54*a* (i.e., the first switch 54*a*(1), the second switch 54*a*(2), . . . , the n-th switch 54*a*(n)) is connected with the amplifier 53 via the signal line L1. The other end of each of the plurality of switches 54*a* (i.e., the first switch 54*a*(1), the second switch 54*a*(2), . . . , and the n-th switch 54*a*(n)) is connected with the individual electrode 85 of a corresponding one of the plurality of actuators 88 (i.e., a first actuator 88(1), a second actuator 88(2), . . . , and an n-th actuator 88(*n*)). A corresponding nozzle 80(*n*) is driven when an n-th actuator 88(*n*) is driven.

The controller 50 transmits a switch control signal for controlling the opening/closing of a specified one of the plurality of switches 54*a* to the switch group 54 via a switch control signal line SL1. The controller 50 transmits synchronization signals S2*a*, S2*b*, and S2*c* to the switch group 54 via a synchronization signal line SL2. It is noted that hereinafter, the synchronization signals S2*a*, S2*b*, and S2*c* may be simply referred to as the "synchronization signals S2." The synchronization signals S2 will be described in detail later.

The switch control signal includes first selection information and second selection information that are associated with each other. The first selection information indicates which is selected from among the plurality of switches 54*a*. The second selection information indicates which is selected from among the three synchronization signals S2*a* to S2*c*.

Figure 5:
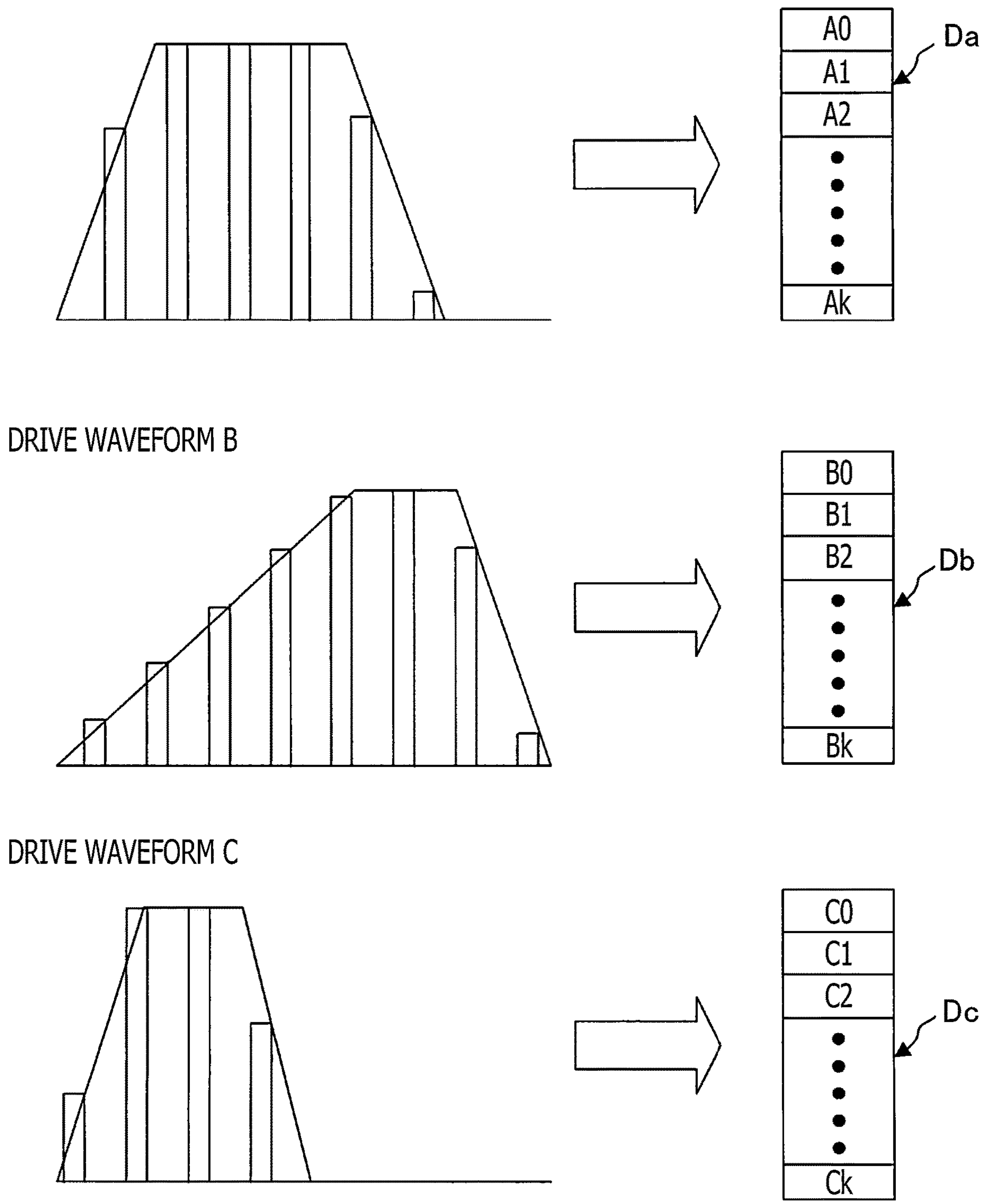
FIG. 5 shows an example of a relationship between drive waveforms A, B, and C and drive waveform data Da, Db, and Dc.

FIG. 5 shows an example of a relationship between drive waveforms A, B, and C and the drive waveform data Da, Db, and Dc. In the drive waveforms shown in FIG. 5, the right side shows an earlier past state than the left side. The same applies to FIGS. 7, 8, 9, 26, 28, 29, and 30. The respective shapes of the drive waveforms A, B, and C are different from each other.

The drive waveform data Da is obtained by converting the drive waveform A into a digital signal at a particular sampling cycle. The drive waveform data Db is obtained by converting the drive waveform B into a digital signal at the particular sampling cycle. The drive waveform data Dc is obtained by converting the drive waveform C into a digital signal at the particular sampling cycle.

The drive waveform data Da is quantized data of the drive waveform A. The drive waveform data Db is quantized data of the drive waveform B. The drive waveform data Dc is quantized data of the drive waveform C. The drive waveform data Da has quantized data Aj (j=0, 1, 2, . . . , k). The drive waveform data Db has quantized data Bj. The drive waveform data Dc has quantized data Cj.

FIG. 6 shows an example of the mapping information table 551. The mapping information table 551 is a table showing data allocated to each of a plurality of time slots into which a particular time frame is divided at each time interval Δt to generate time-series data of a time division multiplex signal.

Fields for management items of the mapping information table 551 include a "time slot number" field and an "allocation data" field. In the "time slot number" field, a particular number (more specifically, a combination of "a" and a number) allocated to each time slot is stored. Each time slot is assigned a particular number (α1, α2, α3 . . . ) in ascending chronological order. The "allocation data" field stores a data name of data Aj, Bj, or Cj (j=0, 1, 2, . . . , k) allocated to each time slot. Each data name [Aj] in FIG. 6 corresponds to the data Aj shown in FIG. 5. Each data name [Bj] in FIG. 6 corresponds to the data Bj shown in FIG. 5. Each data name [Cj] in FIG. 6 corresponds to the data Cj shown in FIG. 5.

Figure 7:
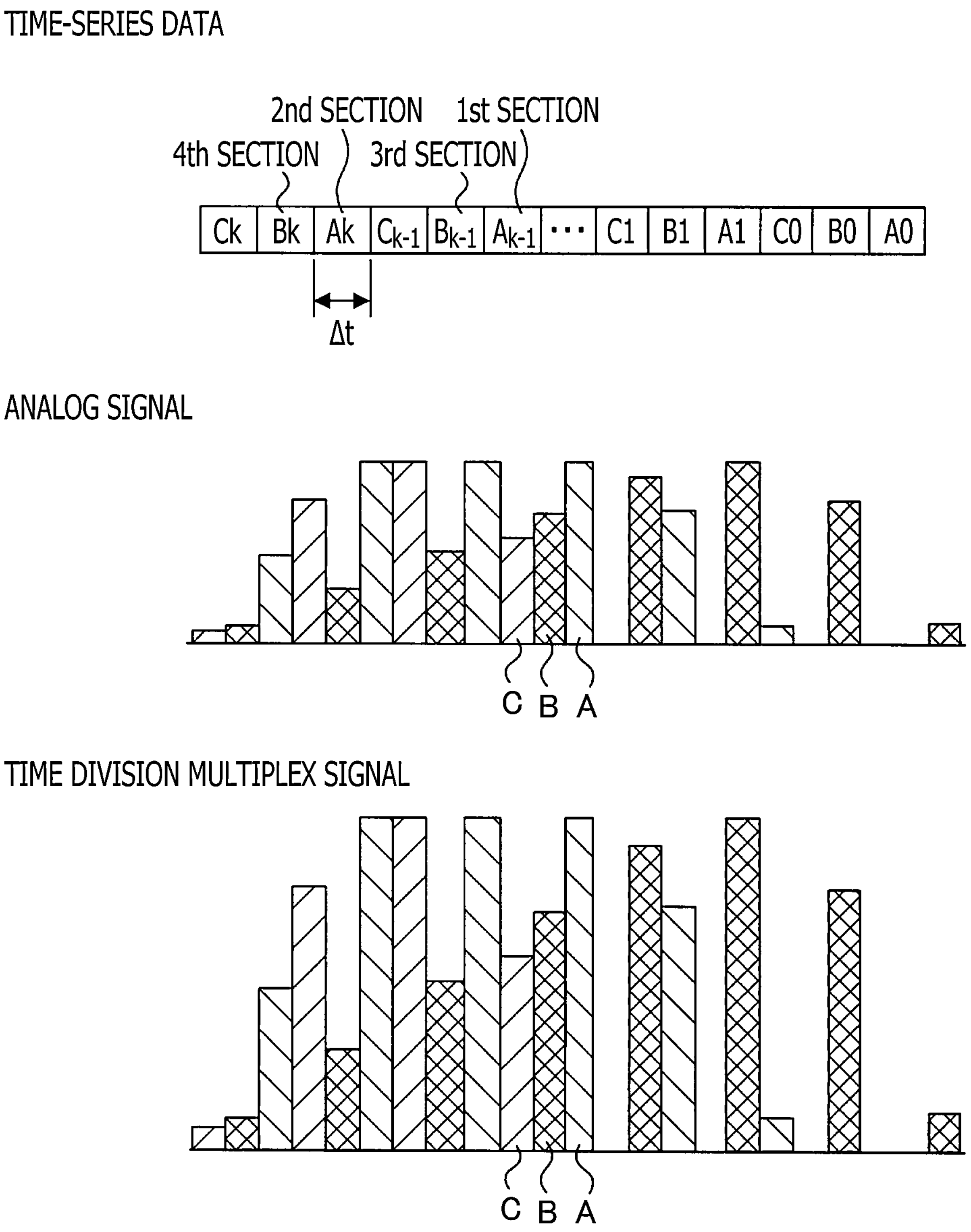
FIG. 7 illustrates examples of time-series data, an analog signal and a time division multiplex signal.

FIG. 7 illustrates examples of time-series data, an analog signal and a time division multiplex signal. In FIGS. 7, A, B, and C indicate the drive waveforms A, B, and C, respectively. To drive the actuators 88, the control circuit 51 accesses the one or more memories 55 and reads out the drive waveform data Da, Db, and Dc and the mapping information table 551, thereby generating time-series data. The time-series data is the data Aj, Bj, and Cj allocated based on the mapping information table 551 to corresponding time slots, respectively, of the plurality of time slots into which a particular time frame is divided at each time interval Δt. In other words, the time-series data is the data Aj, Bj, and Cj (j=0, 1, 2, . . . , k) arranged in order at each time interval Δt, i.e., in the order of A0, B0, C0, A1, B1, C1, . . . , Ak, Bk, Ck. The time-series data is a digital signal. A time interval between the starting ends of Ak-1 and Ak, a time interval between the starting ends of Bk−1 and Bk, and a time interval between the starting ends of Ck−1 and Ck are all 3 Δt.

The control circuit 51 outputs the time-series data to the D/A converter 52. As shown in FIG. 3, the D/A converter 52 converts the time-series data into an analog signal and outputs the analog signal to the amplifier 53. The amplifier 53 amplifies the input analog signal and outputs the amplified analog signal to the switch group 54. As shown in FIG. 7, the analog signal amplified by the amplifier 53 constitutes the time division multiplex signal. In the time division multiplex signal, suppose for instance that a section corresponding to the data Ak-1 is a first section, a section corresponding to the data Ak is a second section, a section corresponding to data Bk−1 is a third section, and a section corresponding to the data Bk is a fourth section. In this case, the third section is between the first section and the second section. The second section is between the third section and the fourth section. Substantially the same relationship as above applies between the data Aj and Cj, and between the data Bj and Cj. The control circuit 51, the D/A converter 52, the amplifier 53, and the one or more memories 55 are included in a multiplexing circuit 50*a*.

Figure 8:
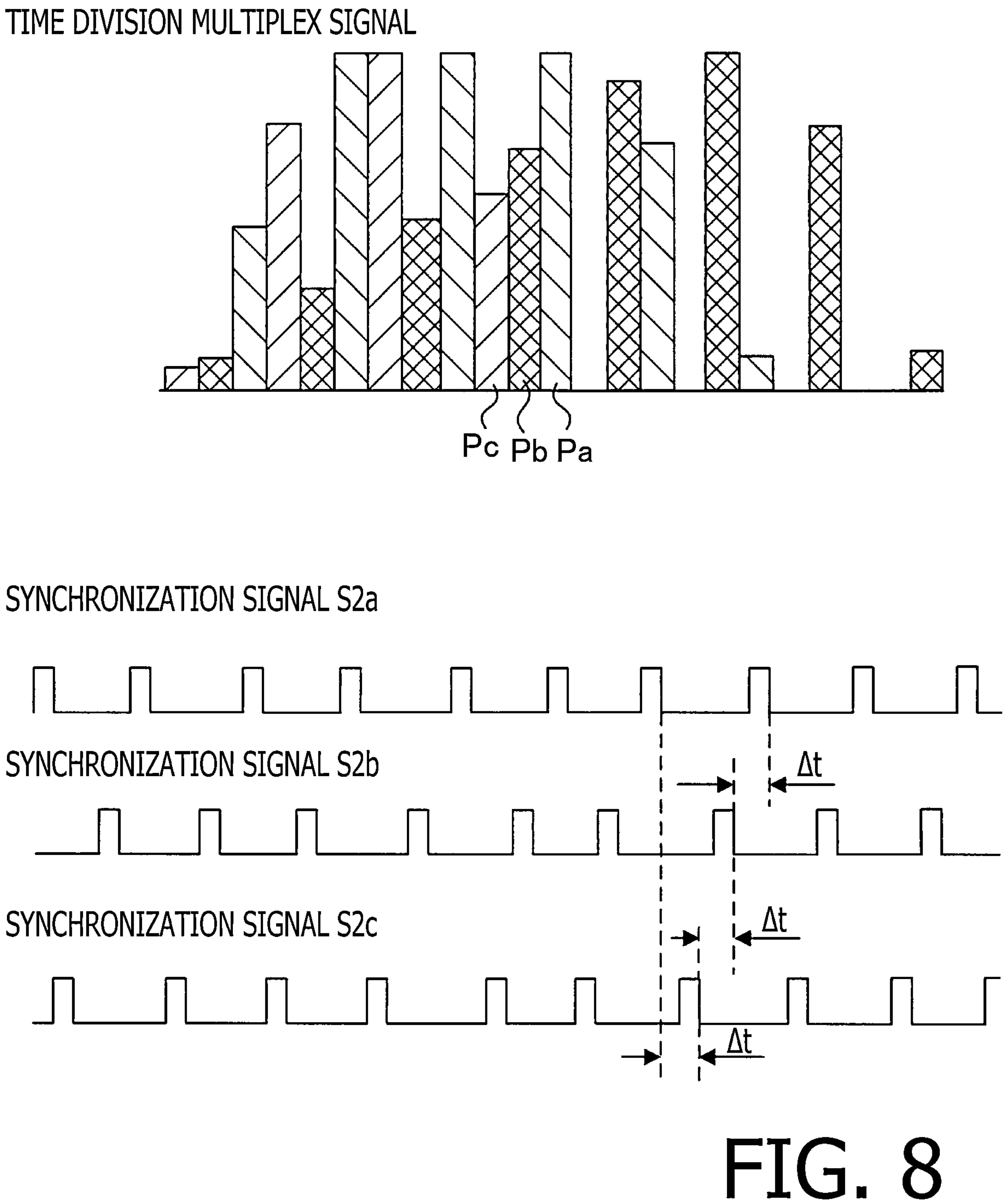
FIG. 8 illustrates a relationship between the time division multiplex signal and synchronization signals S2*a*, S2*b*, and S2*c*.

FIG. 8 illustrates a relationship between the time division multiplex signal and the synchronization signals S2*a*, S2*b*, and S2*c*. The synchronization signals S2*a*, S2*b* and S2*c* are pulse waves. The time interval Δt is provided between a point of time (i.e., a rising edge) at which a pulse of the synchronous signal S2*a* rises and a point of time (i.e., a rising edge) at which a corresponding pulse of the synchronous signal S2*b* rises. The time interval Δt is provided between the rising edge of the pulse of the synchronous signal S2*b* and a rising edge of a corresponding pulse of the synchronous signal S2*c*. The time interval Δt is provided between the rising edge of the pulse of the synchronizing signal S2*c* and the rising edge of the pulse of the synchronizing signal S2*a*. As shown in FIG. 8, a time width over which the pulse rises in each of the synchronization signals S2*a* to S2*c* is narrower than the time width (i.e., the time interval Δt) of each time slot, but may be the same as the time width (i.e., the time interval Δt) of each time slot. Namely, the time width over which the pulse rises in each of the synchronization signals S2*a* to S2*c* is within the time width (i.e., the time interval Δt) of each time slot. The synchronization signals S2*a* to S2*c* are transmitted via the synchronization signal line SL2.

As described above, the data Aj, Bj, and Cj, which constitute the time-series data, are arranged in sequence at the time interval Δt. Therefore, by accessing the time division multiplex signal at the rising edge of each pulse of the synchronization signal S2*a*, it is possible to obtain the drive waveform signal Pa that corresponds to the data Aj and indicates the drive waveform A. By accessing the time division multiplex signal at the rising edge of each pulse of the synchronization signal S2*b*, it is possible to obtain the drive waveform signal Pb that corresponds to the data Bj and indicates the drive waveform B. By accessing the time division multiplex signal at the rising edge of each pulse of the synchronization signal S2*c*, it is possible to obtain the drive waveform signal Pc that corresponds to the data Cj and indicates the drive waveform C.

The switch group 54 is configured to open and close an n-th switch 54*a*(n) specified by the first selection information, at the open-close timing indicated by a specific one of the synchronization signals S2*a* to S2*c* that is specified by the second selection information contained in the transmitted switch control signal.

Figure 9:
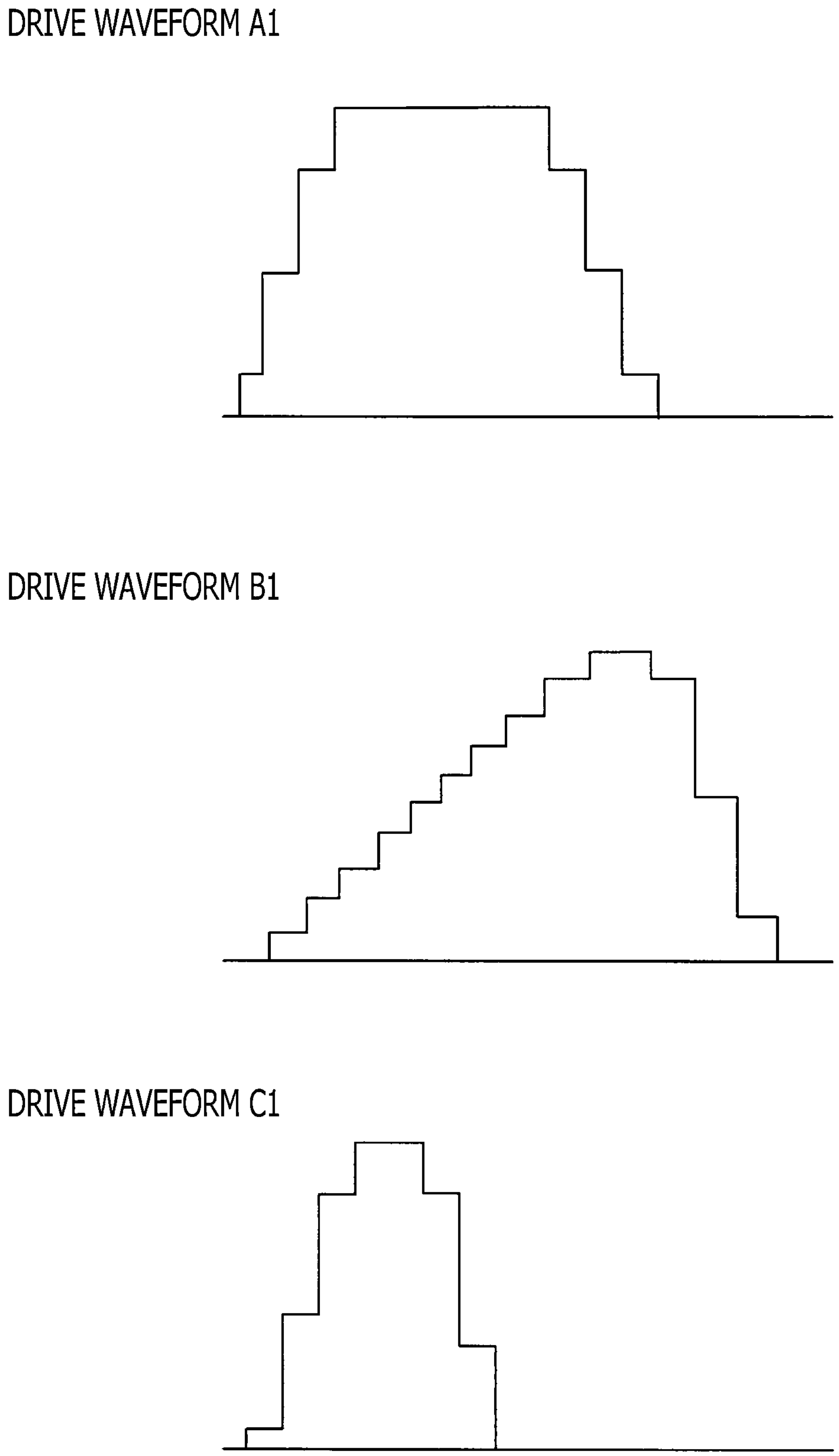
FIG. 9 schematically shows examples of a drive waveform input into an actuator by opening and closing an n-th switch.

FIG. 9 schematically shows examples of the drive waveform input into a corresponding actuator 88 by opening and closing the specified n-th switch 54*a*(n). When the time division multiplex signal and the synchronization signal S2*a* are selected, the switch group 54 closes the n-th switch 54*a*(n) when the pulse of the synchronization signal S2*a* is in a high-level section, and opens the n-th switch 54*a*(n) when the pulse of the synchronization signal S2*a* is in a low-level section. The charge, applied to a corresponding individual electrode 85 when the n-th switch 54*a*(n) is closed, is retained, and the drive waveform A1 (see FIG. 9) is input into the actuator 88. In other words, the drive waveform signal Pa is separated from the time division multiplex signal, and the actuator 88 is driven by the drive waveform signal Pa. In this example of the first illustrative embodiment, the drive waveform A1 may correspond to a "first drive waveform" according to aspects of the present disclosure. The drive waveform signal Pa may correspond to a "first drive waveform signal" according to aspects of the present disclosure. Based on the drive waveform signal Pa, a corresponding nozzle 80 is driven to eject liquid.

When the time division multiplex signal and the synchronization signal S2*b* are selected, the switch group 54 closes the n-th switch 54*a*(n) when the pulse of the synchronization signal S2*b* is in the high-level section, and opens the n-th switch 54*a*(n) when the pulse of the synchronization signal S2*b* is in the low-level section. The charge, applied to the corresponding individual electrode 85 when the n-th switch 54*a*(n) is closed, is retained, and the drive waveform B1 (see FIG. 9) is input into the corresponding actuator 88. In other words, the drive waveform signal Pb is separated from the time division multiplex signal, and the actuator 88 is driven by the drive waveform signal Pb. In this example of the first illustrative embodiment, the drive waveform B1 may correspond to the "first drive waveform" according to aspects of the present disclosure. The drive waveform signal Pb may correspond to the "first drive waveform signal" according to aspects of the present disclosure. Based on the drive waveform signal Pb, the corresponding nozzle 80 is driven to eject liquid.

When the time division multiplex signal and the synchronization signal S2*c* are selected, the switch group 54 closes the n-th switch 54*a*(n) when the pulse of the synchronization signal S2*c* is in the high-level section, and opens the n-th switch 54*a*(n) when the pulse of the synchronization signal S2*c* is in the low level section. The charge, applied to the corresponding individual electrode 85 when the n-th switch 54*a*(n) is closed, is retained, and the drive waveform C1 (see FIG. 9) is input into the corresponding actuator 88. In other words, the drive waveform signal Pc is separated from the time division multiplex signal, and the actuator 88 is driven by the drive waveform signal Pc. In this example of the first illustrative embodiment, the drive waveform C1 may correspond to a "second drive waveform" according to aspects of the present disclosure. The drive waveform signal Pc may correspond to a "second drive waveform signal" according to aspects of the present disclosure. The corresponding nozzle 80 is driven based on the drive waveform signal Pc, and a temperature of the separation circuit 50*b* (i.e., the switch group 54) is increased. At this time, the corresponding nozzle 80 does not eject liquid. Namely, the nozzle 80 is driven to not eject liquid based on the drive waveform signal Pc.

Figure 10:
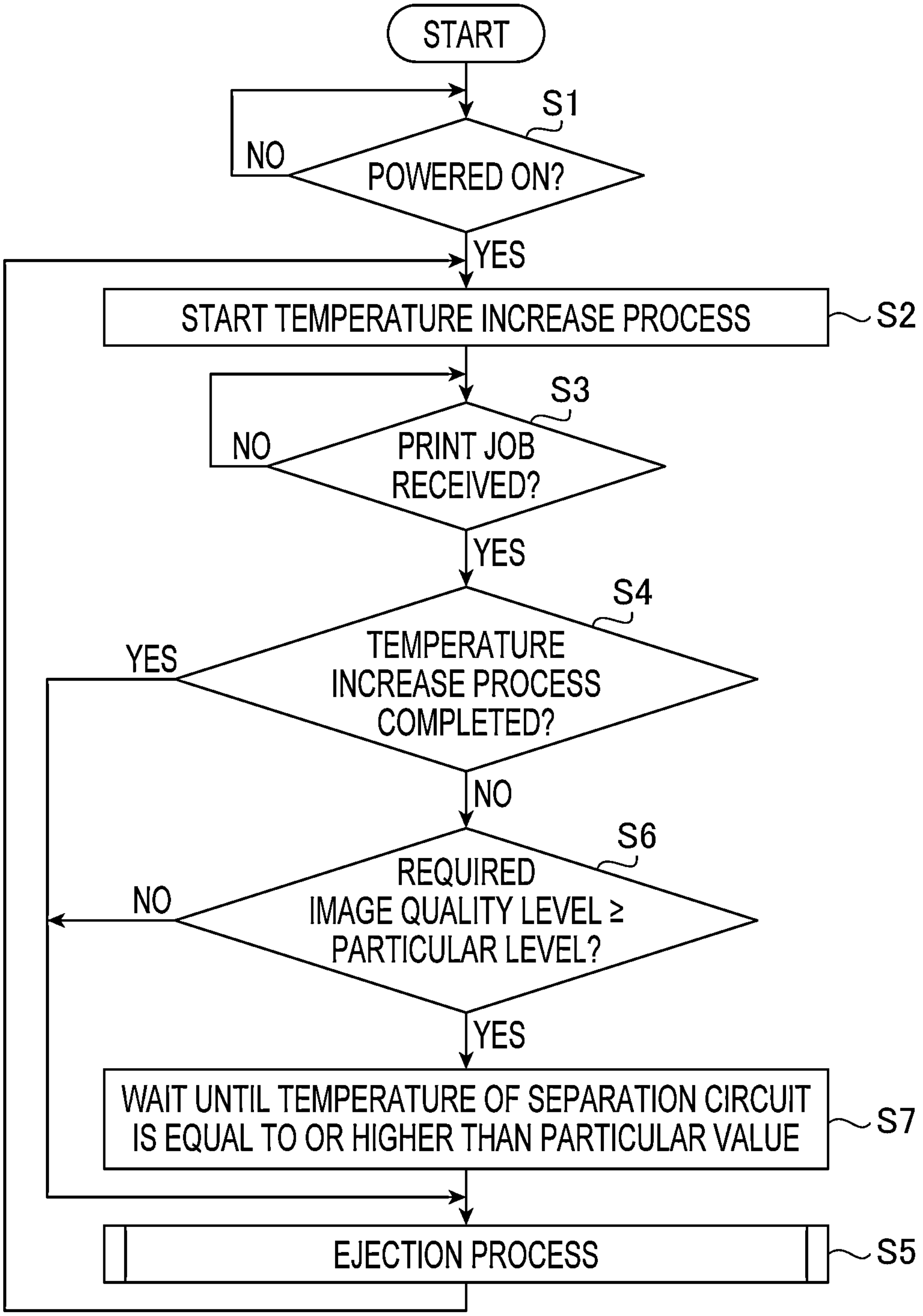
FIG. 10 is a flowchart showing a procedure of a printing process by the controller.

FIG. 10 is a flowchart showing a procedure of a printing process by the controller 50. The controller 50 determines whether the printing apparatus 1 is powered on (S1). In response to determining that the printing apparatus 1 is not powered on (S1: No), the controller 50 goes back to S1 and waits until the printing apparatus 1 is powered on. In response to determining that the printing apparatus 1 is powered on (S1: Yes), the controller 50 starts a temperature increase process (see FIG. 11) (S2). The temperature increase process is a subroutine to be executed in parallel with the printing process. The controller 50 determines whether a print job has been received from the external device 100 (S3). It is noted that the controller 50 does not proceed to S3 after completing the temperature increase process, but rather simultaneously executes S3 and the subsequent steps while performing the temperature increase process as a subroutine. In response to determining that a print job has not been received from the external device 100 (S3: No), the controller 50 goes back to S3. In response to determining that a print job has been received from the external device 100 (S3: Yes), the controller 50 determines whether the temperature increase process is completed (S4). In response to determining that the temperature increase process is completed (S4: Yes), the controller 50 performs an after-mentioned ejection process (see FIG. 12) (S5). Thereafter, the controller 50 goes back to S2. In response to determining that the temperature increase process is not completed (S4: No), the controller 50 determines whether an image quality level, which is required for the printing process and specified in the received print job, is equal to or higher than a particular level (S6). In response to determining that the required image quality level is lower than the particular level (S6: No), the controller 50 proceeds to S5. In response to determining that the required image quality level is equal to or higher than the particular level (S6: Yes), the controller 50 waits until the temperature increase process is completed, and the temperature of the separation circuit 50*b* is equal to or higher than a particular value (S7). Thereafter, the controller 50 proceeds to S5.

Figure 11:
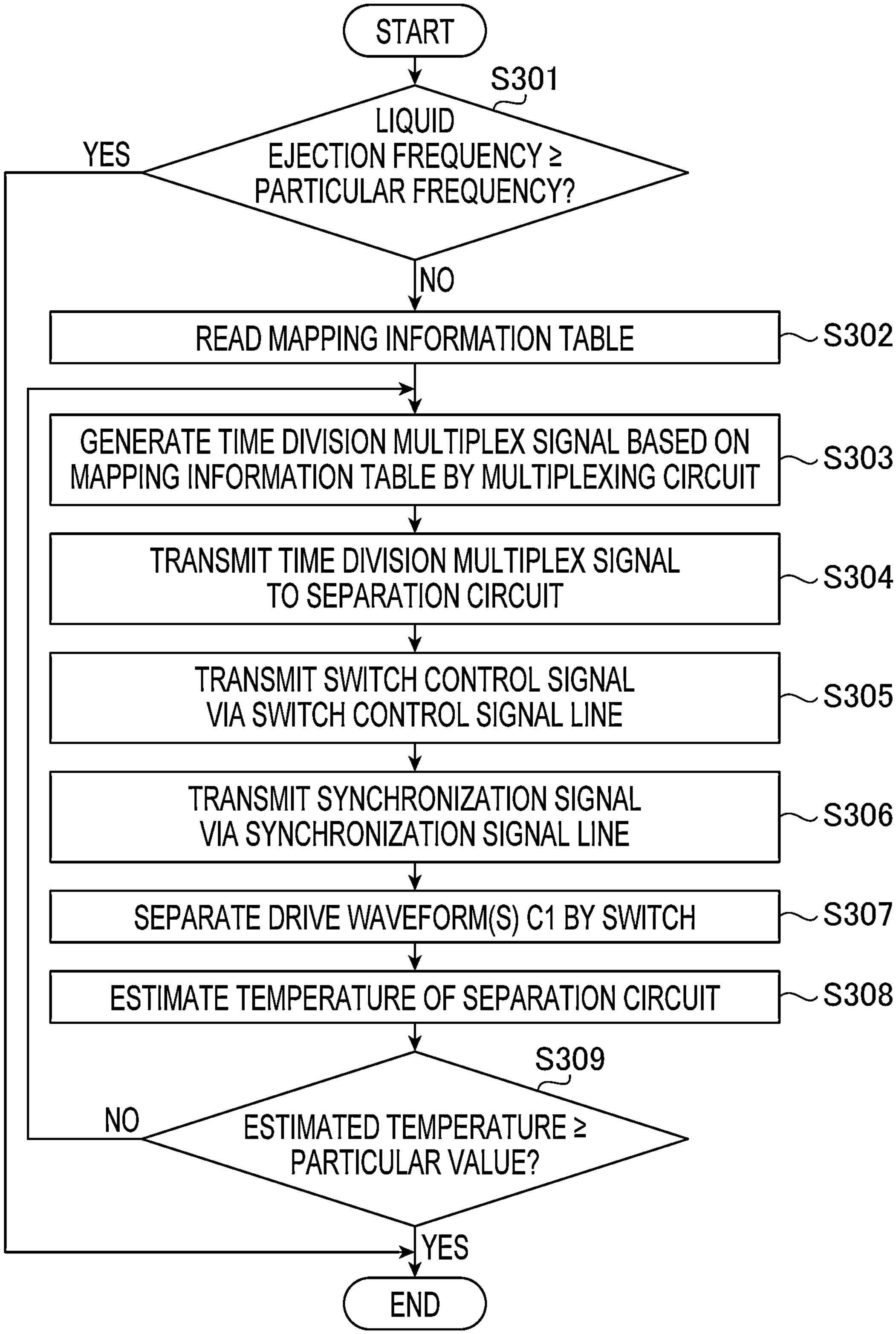
FIG. 11 is a flowchart showing a procedure of a temperature increase process by the controller.

FIG. 11 is a flowchart showing a procedure of the temperature increase process by the controller 50. The controller 50 determines whether the number of ejection processes (i.e., a liquid ejection frequency) within a particular past time is equal to or more than a particular frequency (S301). In response to determining that the liquid ejection frequency is equal to or more than the particular frequency (S301: Yes), the controller 50 terminates the temperature increase process. In response to determining that the liquid ejection frequency is less than the particular frequency (S301: No), the controller 50 reads out the mapping information table 551 from the one or more memories 55 (S302). The controller 50 generates a time division multiplex signal based on the mapping information table 551 by the multiplexing circuit 50*a* (S303). The controller 50 transmits the time division multiplex signal to the separation circuit 50*b* (S304). The controller 50 transmits a switch control signal from the control circuit 51 to the separation circuit 50*b* via the switch control signal line SL1 (S305). The switch control signal transmitted in S305 includes the second selection information indicating the selection of the synchronization signal S2*c*. The controller 50 transmits the synchronization signal S2 from the control circuit 51 to the separation circuit 50*b* via the synchronization signal line SL2 (S306). The controller 50 separates the drive waveform(s) C1 from the time division multiplex signal by a specified switch 54*a* of the separation circuit 50*b* (S307). When the drive waveform(s) C1 are separated in S307, a corresponding nozzle 80 is driven to not eject liquid, and the temperature of the separation circuit 50*b* increases. The controller 50 estimates the temperature of the separation circuit 50*b* (S308). Specifically, in S308, the controller 50 estimates the temperature of the separation circuit 50*b* based on the number of the drive waveform(s) C1 separated in S307. For instance, the controller 50 may obtain the number of pulses of the synchronization signal S2*c* output from the control circuit 51 by an open loop process, or may obtain the number of pulses of the synchronization signal S2*c* input to the separation circuit 50*b* by a feedback process. In another instance, the controller 50 may estimate the temperature of the separation circuit 50*b* based on an outside temperature (i.e., an ambient temperature) of the printing apparatus 1. The controller 50 determines whether the temperature estimated in S308 is equal to or higher than a particular value (S309). In response to determining that the estimated temperature is equal to or higher than the particular value (S309: Yes), the controller 50 terminates the temperature increase process. In response to determining that the estimated temperature is lower than the particular value (S309: No), the controller 50 goes back to S303.

Figure 12:
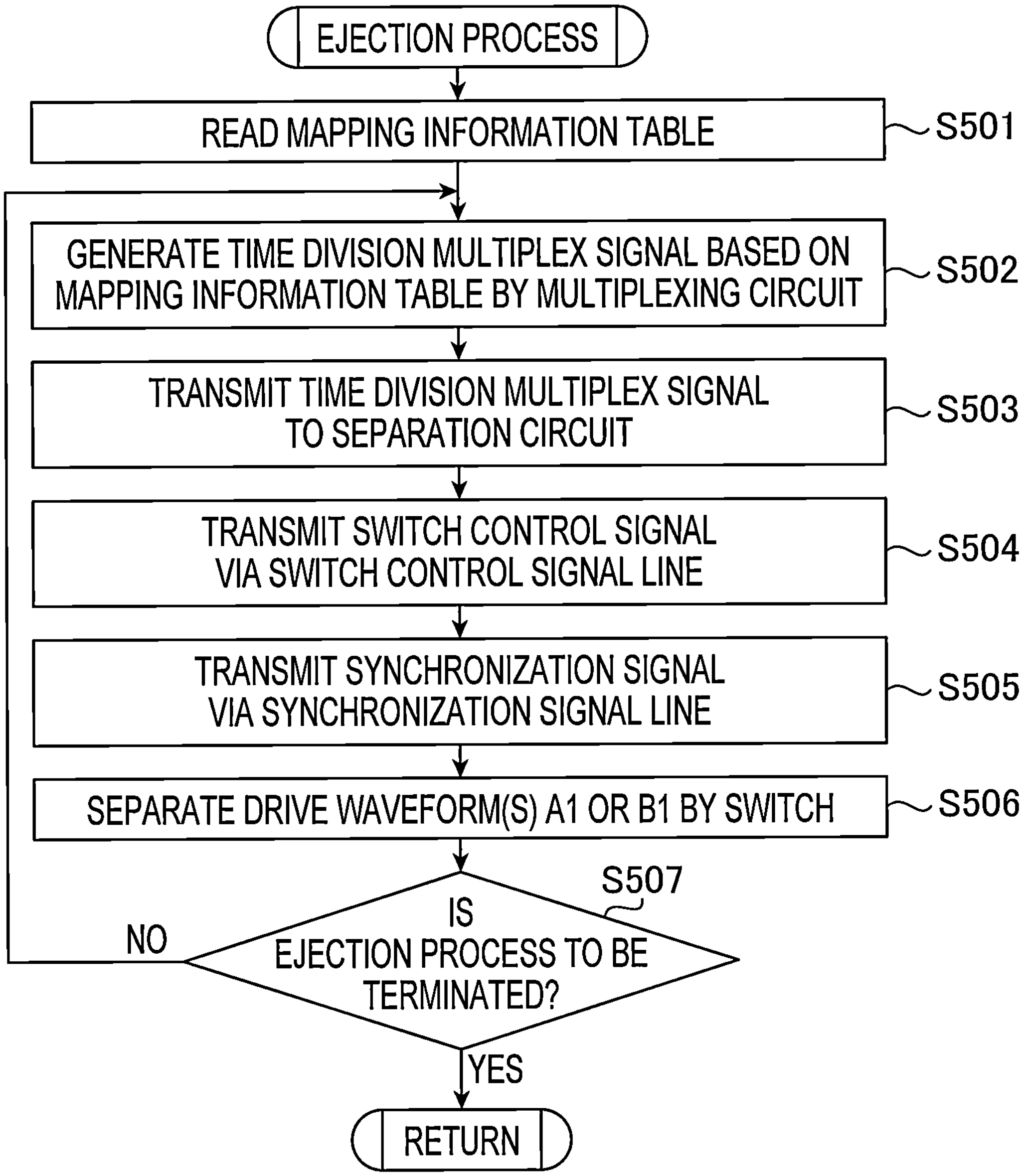
FIG. 12 is a flowchart showing a procedure of an ejection process by the controller.

FIG. 12 is a flowchart showing a procedure of the ejection process by the controller 50. The controller 50 reads out the mapping information table 551 from the one or more memories 55 (S501). The controller 50 generates a time division multiplex signal based on the mapping information table 551 by the multiplexing circuit 50*a* (S502). The controller 50 transmits the time division multiplex signal to the separation circuit 50*b* (S503). The controller 50 transmits a switch control signal from the control circuit 51 to the separation circuit 50*b* via the switch control signal line SL1 (S504). The switch control signal transmitted in S504 includes the second selection information indicating which is selected of the synchronization signals S2*a* and S2*b*. The controller 50 transmits the synchronization signal S2 from the control circuit 51 to the separation circuit 50*b* via the synchronization signal line SL2 (S505). The controller 50 separates the drive waveform(s) A1 or B1 by the switch 54*a* of the separation circuit 50*b* (S506). The controller 50 determines whether the ejection process is to be terminated (S507). In S507, the controller 50 determines that the ejection process is to be terminated when a flushing process or a printing task has been completed. Meanwhile, the controller 50 determines that the ejection process is to be continued when none of the flushing process and the printing task has been completed. In response to determining that the ejection process is to be terminated (S507: Yes), the controller 50 terminates the ejection process. Meanwhile, in response to determining that the ejection process is not to be terminated (S507: No), the controller 50 goes back to S502.

The printing apparatus 1 in the first illustrative embodiment transmits the time division multiplex signal, which includes the drive waveform C for increasing the temperature of the separation circuit 50*b*, without ejecting liquid from the nozzles 80. The controller 50 causes the separation circuit 50*b* to separate the drive waveform(s) C1, thereby electrifying the switch 54*a* of the separation circuit 50*b* to generate heat due to the electrical resistance of the switch 54*a*. By performing the aforementioned process when the temperature of the separation circuit 50*b* is estimated to be low, it is possible to keep the temperature of the separation circuit 50*b* (i.e., the temperature around the switch group 54) constant when the nozzles 80 eject liquid therefrom. Thereby, it is possible to keep the quality of liquid ejection from the nozzles 80 constant. In the first illustrative embodiment, a temperature sensor may be disposed near the separation circuit 50*b* or the separation circuit 50*b*. In this case, the controller 50 may determine whether to increase the temperature of the separation circuit 50*b* based on the temperature measured by the temperature sensor.

Second Illustrative Embodiment

In a printing apparatus 1 in a second illustrative embodiment according to aspects of the present disclosure, two switches (i.e., an a-switch 54*a* and a b-switch 54*b*) are connected with each single actuator. When the drive waveform is separated by the a-switch 54*a*, the corresponding nozzle 80 ejects liquid. When the drive waveform is separated by the b-switch 54*b*, the corresponding nozzle 80 does not eject liquid, and the temperature of the separation circuit 50*b* increases. The liquid ejected from the corresponding nozzle 80 is either a specific ink or a non-specific ink. The specific ink(s) are types of ink (liquid) of which properties are likely to easily change with an increase in temperature. Therefore, the temperature of the separation circuit 50*b* is preferred to be not increased before the nozzle 80 ejects a specific ink. When the liquid to be ejected from the nozzle 80 is a non-specific ink, as specified in the print job, the controller 50 causes the b-switch 54*b* to separate the drive waveform signal and increases the temperature of the separation circuit 50*b*. A technical concept according to aspects of the present disclosure will be described below with reference to relevant drawing(s) illustrating the printing apparatus 1 in the second illustrative embodiment. Among elements in the second illustrative embodiment, elements having substantially the same configurations as in the aforementioned first illustrative embodiment will be provided with the same reference characters, and detailed explanations thereof may be omitted. The a-switch 54*a* in the second illustrative embodiment has substantially the same configuration as the switch 54*a* in the aforementioned first illustrative embodiment, and therefore is provided with the same reference characters as the switch 54*a* in the first illustrative embodiment.

Figure 13:
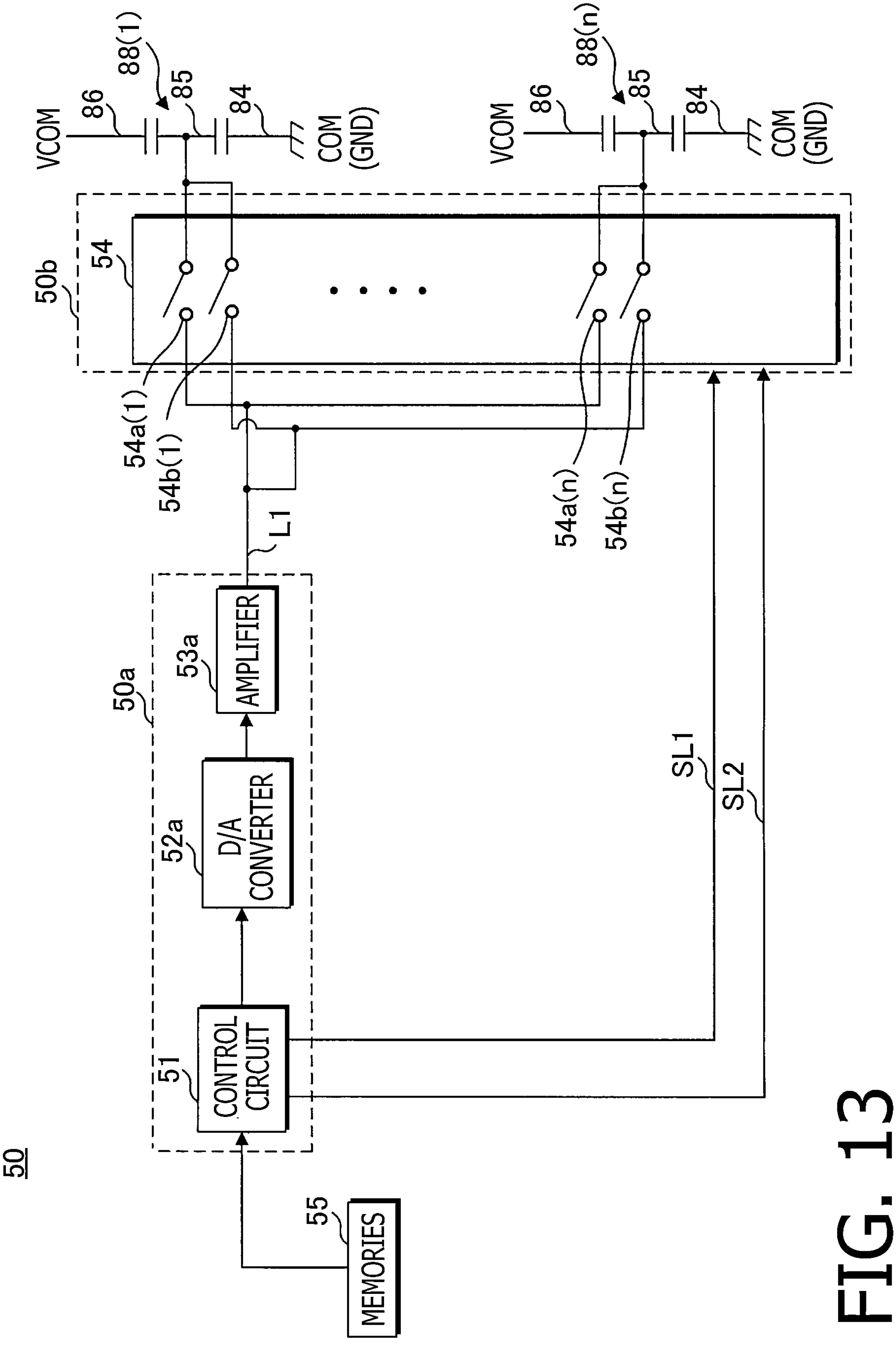
FIG. 13 is a block diagram showing an electrical configuration of a controller of a printing apparatus.

FIG. 13 is a block diagram showing an electrical configuration of a controller 50 in the second illustrative embodiment. A switch group 54 of the controller 50 in the second illustrative embodiment includes a plurality of b-switches 54*b*. The plurality of b-switches 54*b* include a first b-switch 54*b*(1), a second b-switch 54*b*(2), . . . , and an n-th b-switch 54*b*(n). For instance, the a-switches 54*a* and the b-switches 54*b* include analog switch ICs.

One end of each of the first b-switch 54*b*(1), the second b-switch 54*b*(2), . . . , and the n-th b-switch 54*b*(n) is connected with the amplifier 53 via the signal line L1. The other end of each of the first b-switch 54*b*(1), the second b-switch 54*b*(2), . . . , and the n-th b-switch 54*b*(n) is connected with a corresponding one of the respective individual electrodes 85 of the first actuator 88(1), the second actuator 88(2), . . . , and the n-th actuators 88(*n*).

A resistance value of a b-switch 54*b* when the b-switch 54*b* is turned on to be electrified is different from (specifically, higher than) a resistance value of a corresponding a-switch 54*a* when the a-switch 54*a* is turned on to be electrified. When the drive waveform is separated by the a-switch 54*a*, the corresponding nozzle 80 ejects liquid. When the drive waveform is separated by the b-switch 54*b*, the corresponding nozzle 80 does not eject liquid, and the temperature of the separation circuit 80*b* increases. The resistance of the b-switch 54*b* may be equal to or lower than the resistance of the a-switch 54*a*.

The controller 50 in the second illustrative embodiment transmits (outputs) a switch control signal for controlling the opening and closing of a specified one of the plurality of a-switches 54*a* or the plurality of b-switches 54*b* to the switch group 54 via the switch control signal line SL1. The switch control signal includes first selection information and second selection information. The first selection information indicates which is selected from among the plurality of a-switches 54*a* or from among the plurality of b-switches 54*b*. The second selection information indicates which is selected from among the three synchronization signals S2*a* to S2*c*.

Figure 14:
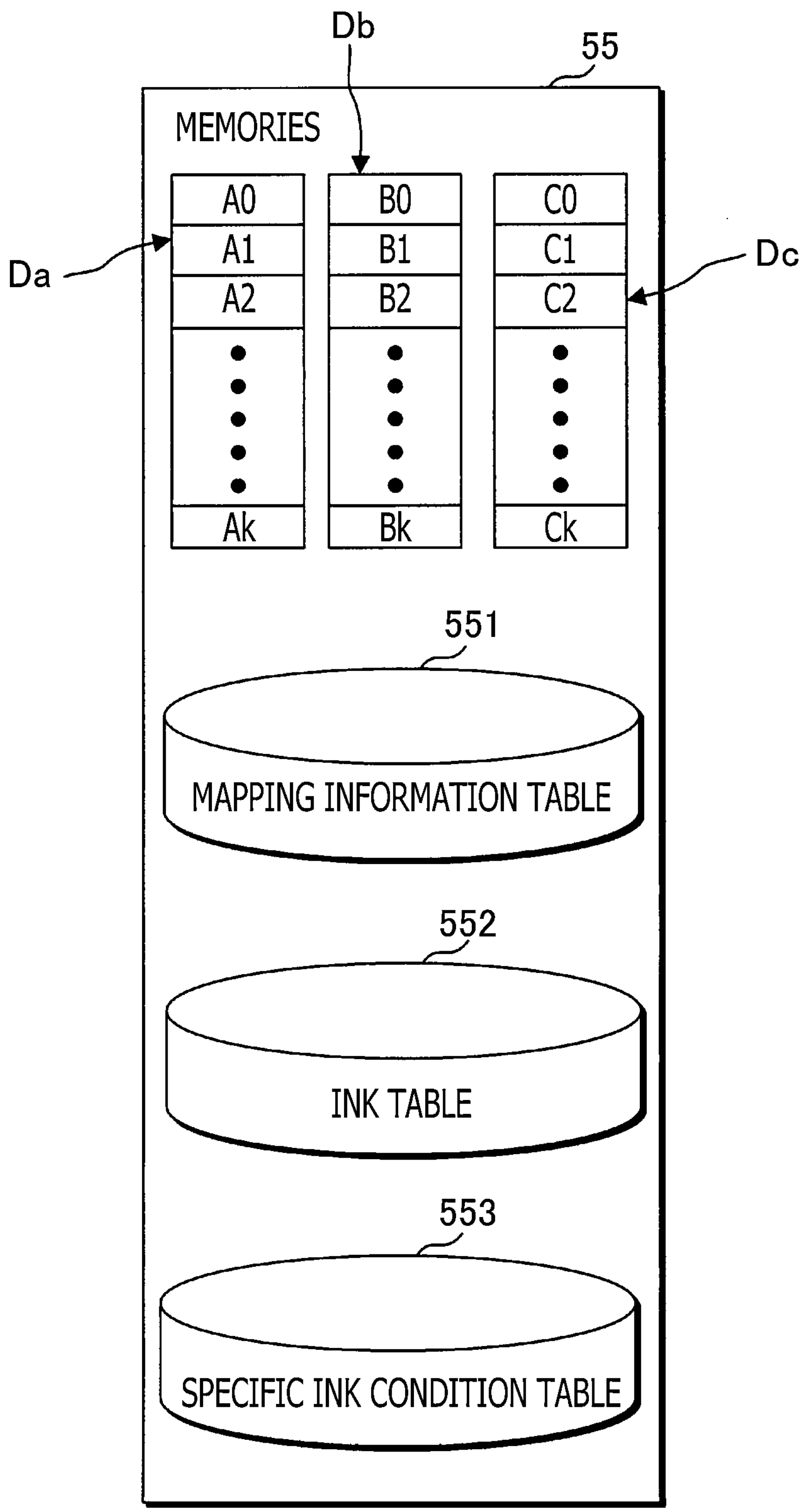
FIG. 14 is a block diagram showing drive waveform data and tables that are stored in one or more memories of the printing apparatus.

FIG. 14 is a block diagram showing drive waveform data and tables stored in one or more memories 55 in the second illustrative embodiment. The one or more memories 55 in the second illustrative embodiment store an ink table 552 and a specific ink condition table 553.

FIG. 15 shows an example of the ink table 552. The ink table 552 stores information regarding the composition of each type of ink (liquid) that is ejected from the nozzles 80. Fields for management items of the ink table 552 include, for instance, an “ink name” field, a “resin particle” field, an “organic solvent having saturated vapor pressure of 0.03 hPa or higher” field, a “colorant solid content” field, an “average pigment particle size” field, and a “water” field. The “ink name” field stores an ink name for identifying each type of ink. The “resin particle” field stores a ratio (mass %) of resin particles contained in each type of ink. The “organic solvent having saturated vapor pressure of 0.03 hPa or higher” field stores a ratio (mass %) of organic solvent, contained in each type of ink, having a saturated vapor pressure of 0.03 hPa or higher at 20° C. The “colorant solid content” field stores a ratio (mass %) of a colorant solid content in each type of ink. The “average pigment particle size” field stores an average particle size (nm) of pigment particles contained in each type of ink. The “water” field stores a ratio (mass %) of water contained in each type of ink. In addition to the components shown in FIG. 15, each type of ink to be ejected from the nozzles 80 contains other components such as surfactants or solvents for pigments. FIG. 15 shows the composition of components related to conditions under which each type of ink is considered as a specific ink.

FIG. 16 shows an example of the specific ink condition table 553. The specific ink condition table 553 stores conditions for an ink to be determined as a specific ink. Fields for management items of the specific ink condition table 553 include, for instance, a “condition item” field and a “condition range” field. The “condition item” field stores items of conditions for determining whether a target ink is a specific ink. A value stored in each record of the “condition item” field is associated with a corresponding one of the management items of the ink table 552. The “condition range” field stores a numerical range within which the target ink is determined to be a specific ink when the target ink has a specific value for each condition item. The specific ink(s) in the second illustrative embodiment are types of ink (liquid) that satisfy at least one of the following conditions. One of the conditions is that resin particles are contained in a ratio of 1 mass % (inclusive) to 10 mass % (inclusive). Another condition is that an organic solvent having a saturated vapor pressure of 0.03 hPa or higher at 20° C. is contained in a ratio of 10 mass % (inclusive) to 30 mass % (inclusive). Another condition is that a colorant solid content is contained in a ratio of 2 mass % (inclusive) to 10 mass % (inclusive). Yet another condition is that the average particle size of pigment particles contained is equal to or greater than 150 nm. Still another condition is that water is contained in a ratio of 60 mass % or less. The numerical value(s) in each condition are not limited to those mentioned above.

In a case of an ink in which resin particles are contained in a ratio of 1 mass % or more, an organic solvent having a saturated vapor pressure of 0.03 hPa or higher at 20° C. is contained in a ratio of 10 mass % or more, and/or a colorant solid content is contained in a ratio of 2 mass % or more, such an ink has a high ratio of polymer contained and is quick-drying or highly coagulable due to heat. An ink, in which the average particle size of pigment particles contained is equal to or greater than 150 nm, is prone to particle sedimentation and nozzle clogging due to heat. An ink, in which water is contained in a ratio of 60 mass % or less, has a high ratio of solvent contained and are quick-drying due to heat. For the reasons mentioned above, an ink that satisfies at least one of the conditions shown in the specific ink condition table 533 is considered to be a specific ink that are unsuitable for heating.

In response to receiving a print job from the external device 100, the controller 50 refers to the ink table 552 and the specific ink condition table 553 based on the ink name of the ink identified in the print job, and determines whether the ink to be ejected from the nozzles 80 is a specific ink. When at least one of the items in the record of the identified ink in the ink table 552 has a specific value within the numerical range defined for the corresponding item in the specific ink condition table 553, the controller 50 determines that the ink is a specific ink. Meanwhile, when none of the items in the record of the identified ink in the ink table 552 has a specific value within the numerical range defined for the corresponding item in the specific ink condition table 553, the controller 50 determines that the ink is a non-specific ink. In this example, each of the inks A to G stored in the ink table 552 is determined as a specific ink since the inks A to G satisfy at least one of the conditions defined in the specific ink condition table 553. The ink H is determined to be a non-specific ink since the ink H satisfies none of the conditions defined in the specific ink condition table 553.

The ink table 552 may include an "ink type" field to store information indicating whether the ink in each record is a specific ink or a non-specific ink. In this case, based on the ink name of the ink identified in the print job, the controller 50 may determine whether the ink is a specific ink or a non-specific ink based on a value stored in the "ink type" field of the ink table 552. The ink table 552 and the specific ink condition table 553 may be stored in the external device 100. In this case, the print job may include information indicating whether the identified ink is a specific ink or a non-specific ink.

Figure 17:
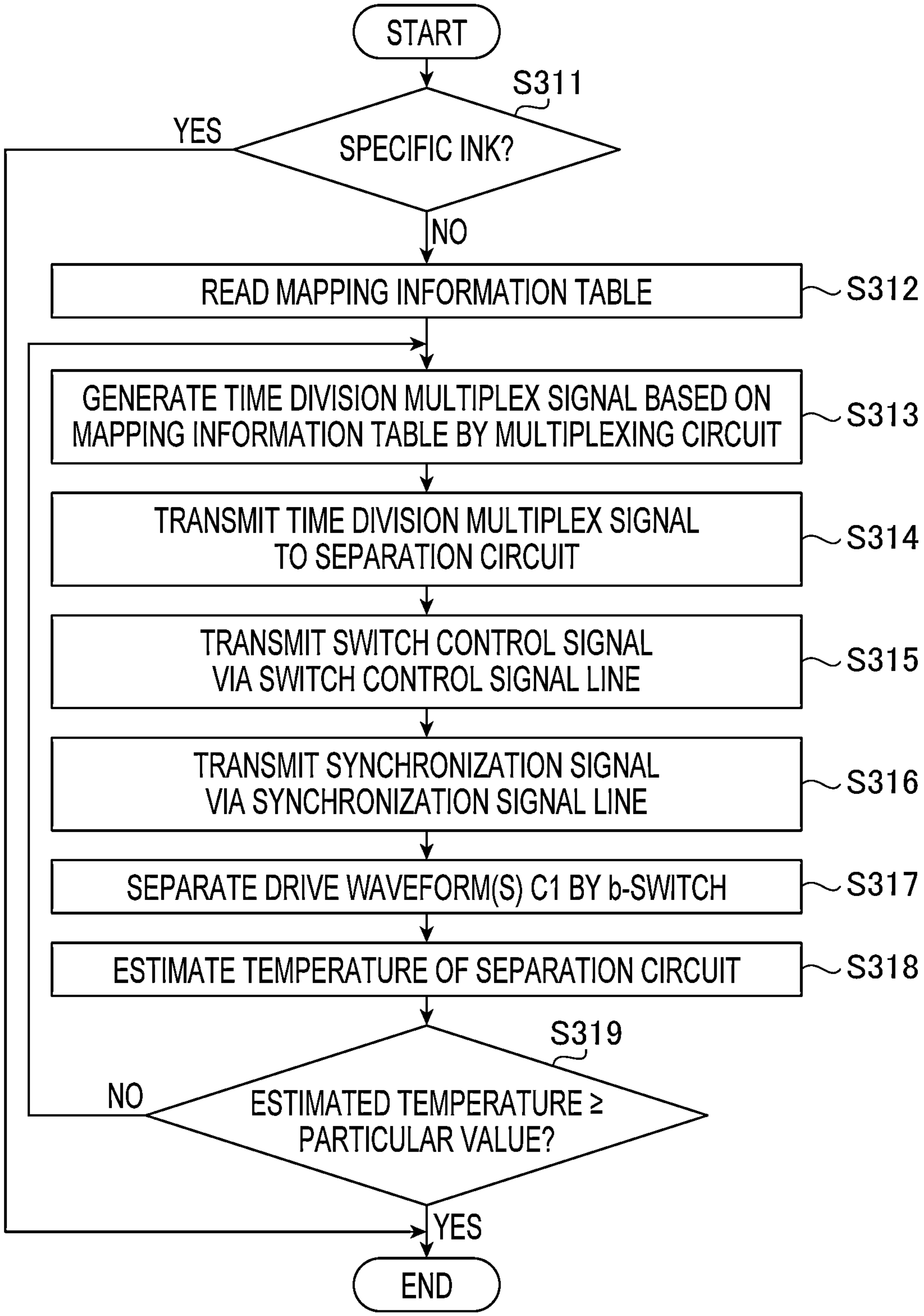
FIG. 17 is a flowchart showing a procedure of a temperature increase process by the controller.

FIG. 17 is a flowchart showing a procedure of a temperature increase process by the controller 50 in the second illustrative embodiment. The controller 50 refers to the ink table 552 and the specific ink condition table 553 and determines whether the ink identified in the print job is a specific ink (S311). In response to determining that the identified ink is a specific ink (S311: Yes), the controller 50 terminates the temperature increase process. In response to determining that the identified ink is a non-specific ink (S311: No), the controller 50 proceeds to S312. A process of S312 to S314 in FIG. 17 is substantially the same as the process of S302 to S304 in FIG. 11. The controller 50 transmits a switch control signal via the switch control signal line SL1 (S315). The switch control signal transmitted in S315 includes first selection information and second selection information. The first selection information indicates the selection of a b-switch 54*b*. The second selection information indicates the selection of the synchronization signal S2*c*. The controller 50 transmits the synchronization signal S2 from the control circuit 51 to the separation circuit 50*b* via the synchronization signal line SL2 (S316). The controller 50 separates the drive waveform(s) C1 by the b-switch 54*b* (S317). A process of S318 to S319 in FIG. 17 is substantially the same as the process of S308 to S309 in FIG. 11.

Figure 18:
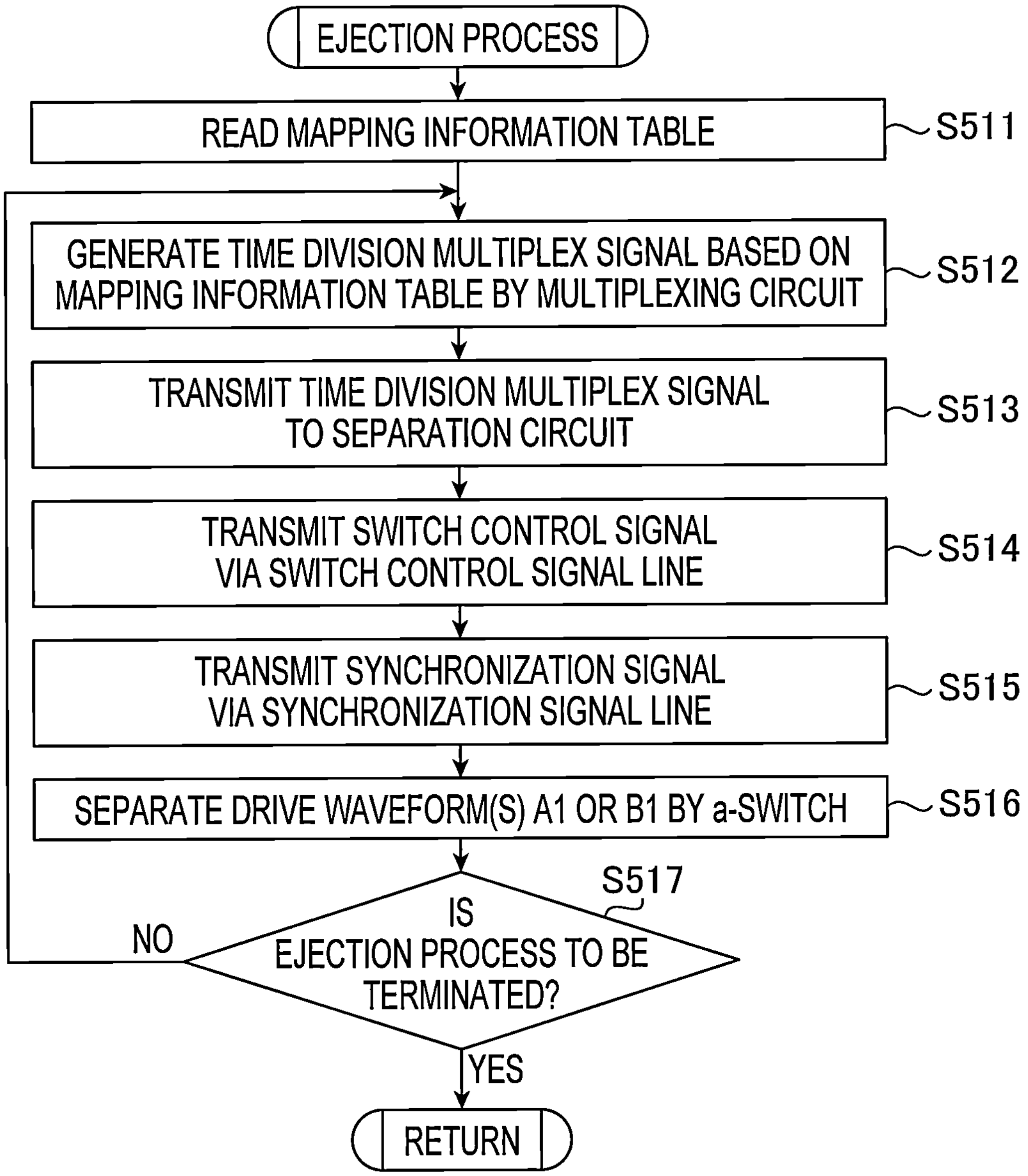
FIG. 18 is a flowchart showing a procedure of an ejection process by the controller.

FIG. 18 is a flowchart showing a procedure of an ejection process by the controller 50 in the second illustrative embodiment. A process of S511 to S513 in FIG. 18 is substantially the same as the process of S501 to S503 in FIG. 12. The controller 50 transmits a switch control signal via the switch control signal line SL1 (S514). The switch control signal transmitted in S514 includes first selection information and second selection information. The first selection information indicates the selection of an a-switch 54*a*. The second selection information indicates the selection of the synchronization signal S2*a* or S2*b*. The controller 50 transmits the synchronization signal S2 from the control circuit 51 to the separation circuit 50*b* via the synchronization signal line SL2 (S515). The controller 50 separates the drive waveform(s) A1 or B1 by the a-switch 54*a* of the separation circuit 50*b* (S516). The process in S517 is substantially the same as in S507 shown in FIG. 12.

In the printing apparatus 1 in the second illustrative embodiment, when the ink (liquid) to be ejected from the nozzles 80 is a specific ink of which the properties are likely to easily change with an increase in temperature, the temperature of the separation circuit 50*b* is not increased. Meanwhile, when the ink (liquid) to be ejected from the nozzles 80 is a non-specific ink, the temperature of the separation circuit 50*b* is increased. Thereby, it is possible to maintain the quality of liquid ejection from the nozzles 80 at a constant level. The a-switches 54*a* may be configured to separate the drive waveform C1. The b-switches 54*b* may be configured to separate the drive waveform A1 or B1.

Third Illustrative Embodiment

In a printing apparatus 1 in a third illustrative embodiment according to aspects of the present disclosure, three b-switches 54*b*, each of which is configured to increase the temperature of the separation circuit 50*b* by separating a drive waveform signal, are connected with each single actuator 88. The controller 50 of the printing apparatus 1 determines the number of b-switches 54*b* that are to be used (electrified) to separate drive waveform signals in accordance with a temperature increase necessity degree based on the composition of the ink (liquid) to be ejected from the nozzles 80. A technical concept according to aspects of the present disclosure will be described below with reference to relevant drawing(s) illustrating the printing apparatus 1 in the third illustrative embodiment. Among elements in the third illustrative embodiment, elements having substantially the same configurations as in the aforementioned first illustrative embodiment and/or the aforementioned second illustrative embodiment will be provided with the same reference characters, and detailed explanations thereof may be omitted.

Figure 19:
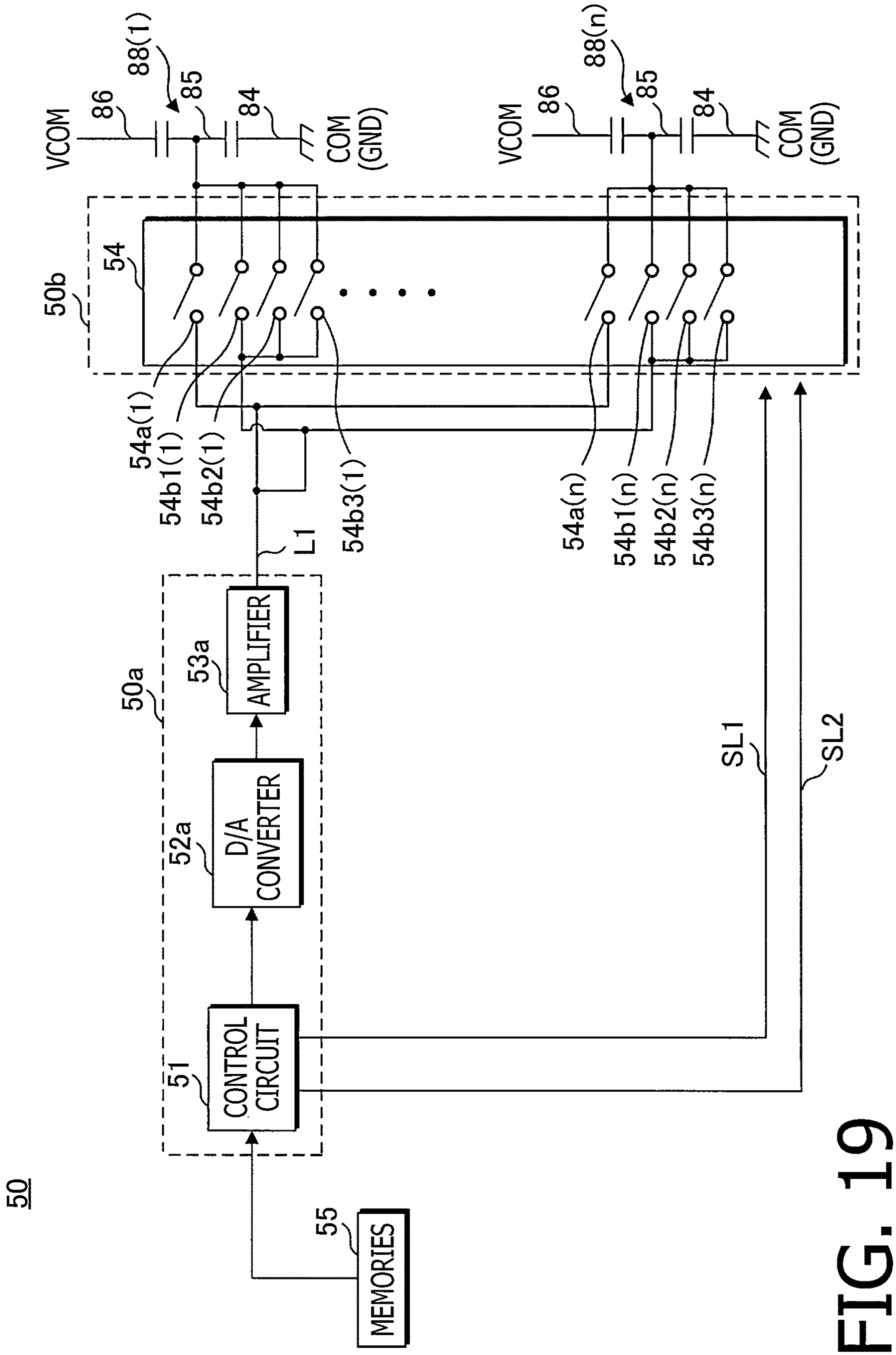
FIG. 19 is a block diagram showing an electrical configuration of a controller of a printing apparatus.

FIG. 19 is a block diagram showing an electrical configuration of a controller 50 in the third illustrative embodiment. A switch group 54 of the controller 50 in the second illustrative embodiment includes three b-switches 54*b* (i.e., a b1-switch 54*b*1, a b2-switch 54*b*2, and a b3-switch 54*b*3) that are connected with each single actuator 88. The b1-switch 54*b*1, the b2-switch 54*b*2, and the b3-switch 54*b*3 are connected in parallel, and each of them has substantially the same configuration as the b-switches 54*b* in the aforementioned second illustrative embodiment.

Figure 20:
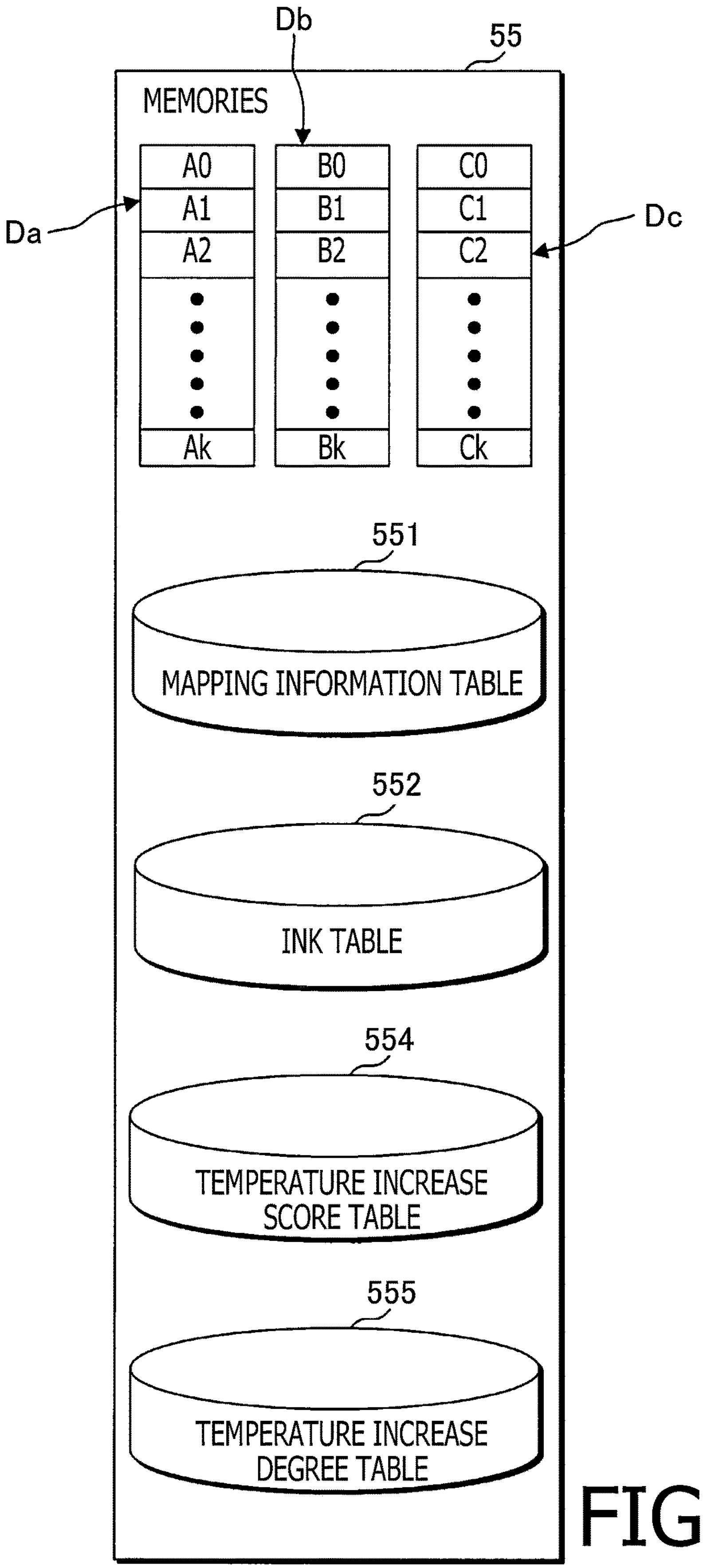
FIG. 20 is a block diagram showing drive waveform data and tables that are stored in one or more memories of the printing apparatus.

FIG. 20 is a block diagram showing drive waveform data and tables stored in one or more memories 55 in the third illustrative embodiment. The one or more memories 55 in the third illustrative embodiment store a temperature increase score table 554 and a temperature increase degree table 555. The controller 50 refers to the temperature increase score table 554 and calculates a temperature increase necessity degree, pertaining to ink ejection from the nozzles 80, of the separation circuit 50*b*. Thereafter, based on the temperature increase necessity degree, the controller 50 refers to the temperature increase degree table 555 and determines the number of b-switches 54*b* used to separate the drive waveform signals.

FIG. 21 shows an example of the temperature increase score table 554. The temperature increase score table 554 stores a score to be added to the temperature increase necessity degree, for each of the values stored in each management item of the ink table 552. Fields for the management items of the temperature increase score table 554 include a "score" field, a "resin particle range" field, a "resin particle" field, an "organic solvent having saturated vapor pressure of 0.03 hPa or higher" field, a "colorant solid content" field, an "average pigment particle size" field, and a "water" field. The "score" field stores scores, each of which is added to the temperature increase necessity degree when the target ink satisfies one of the conditions in a corresponding record of the temperature increase score table 554. Each of the other fields (i.e., the "resin particle range" field, the "resin particle" field, the "organic solvent having saturated vapor pressure of 0.03 hPa or higher" field, the "colorant solid content" field, the "average pigment particle size" field, and the "water" field) stores conditions, each of which represents a numerical range within which a corresponding score is added to the temperature increase necessity degree when the target ink has a specific value for a corresponding management item. The controller 50 reads out the composition of the ink identified in the print job from the ink table 552, and refers to the temperature increase score table 554, thereby calculating the temperature increase necessity degree based on a condition in each management item that the read composition of the identified ink satisfies. Namely, the temperature increase necessity degree is an integrated value (i.e., a summation) of the respective scores for the individual management items in the temperature increase score table 554. For instance, in the ink A shown in the ink table 552 (see FIG. 15), a score of 2 is added because resin particles are contained in a ratio of 2 mass %, which is equal to or more than 1% and less than 4%. Further, a score of 3 is added because an organic solvent having a saturated vapor pressure of 0.03 hPa or higher at 20° C. is contained in a ratio of 7 mass %, which is less than 10%. Further, a score of 3 is added because a colorant solid content is contained in a ratio of 1 mass %, which is less than 2%. Further, a score of 3 is added because the average particle size of pigment particles contained is 60 nm, which is less than 80 nm. Further, a score of 3 is added because water is contained in a ratio of 85 mass %, which is equal to or more than 0%. As a result, the temperature increase necessity degree of the ink A is 14.

FIG. 22 shows an example of the temperature increase degree table 555. The temperature increase degree table 555 stores the number of b-switches **54*b* for separating the drive waveform signal for the calculated temperature increase necessity degree. The management items (fields) of the temperature increase degree table 555 include, for instance, a "temperature increase necessity degree" field and a "number of switches" field. The "temperature increase necessity degree" field stores a numerical range of the temperature increase necessity degree in association with each value for the number of b-switches 54*b* for separating the drive waveform signal. The "number of switches" field stores the number of b-switches 54*b* for separating the drive waveform signal in association with each numerical range for the temperature increase necessity degree. Based on the calculated temperature increase necessity degree, the controller 50 refers to the temperature increase degree table 555 and determines the number of b-switches 54*b* for separating the drive waveform signal. The larger the number of b-switches 54*b* for separating the drive waveform signal is, the higher a temperature increase degree of the separation circuit 50*b* is. In other words, the controller 50 refers to the temperature increase score table 554 and the temperature increase degree table 555, and determines the temperature increase degree of the separation circuit 50*b* according to the properties of the ink (liquid) to be ejected from the nozzles 80. It is noted that the temperature increase degree represents how much the temperature of the separation circuit 50*b* is to be increased. The temperature increase score table 555 may have a "drive waveform separation switch" field instead of or in addition to the "number of switches" field. The "drive waveform separation switch" field may store information (e.g., identification information of the b1 switch 54*b*1, identification information of the b2 switch 54*b*2, and/or identification information of the b3 switch 54*b*3) for identifying b-switches 54*b* for separating the drive waveform signal. In this case, the controller 50 may cause b-switches 54*b*, identified by the identification information stored in the "drive waveform separation switch" field, to separate the drive waveform signals. For instance, the "drive waveform separation switch" field may store the identification information of the b1 switch 54*b*1, the identification information of the b2 switch 54*b*2, and the identification information of the b3 switch 54*b*3, in association with a value of 3 for the number of b switches 54*b*. In addition, the "drive waveform separation switch" field may store two pieces of identification information selected from among the identification information of the b1 switch 54*b*1, the identification information of the b2 switch 54*b*2, and the identification information of the b3 switch 54*b*3, in association with a value of 2 for the number of b switches 54*b*. Further, the "drive waveform separation switch" field may store one piece of identification information selected from among the identification information of the b1 switch 54*b*1, the identification information of the b2 switch 54*b*2, and the identification information of the b3 switch 54*b*3, in association with a value of 1 for the number of b switches 54*b*. Furthermore, the controller 50 may store a table containing a condition for each item related to the ink composition. In this case, the controller 50 may determine the number of b-switches 54*b* for separating the drive waveform signal, according to the number of conditions satisfied by the ink to be ejected from the nozzles 80**.

Figure 23:
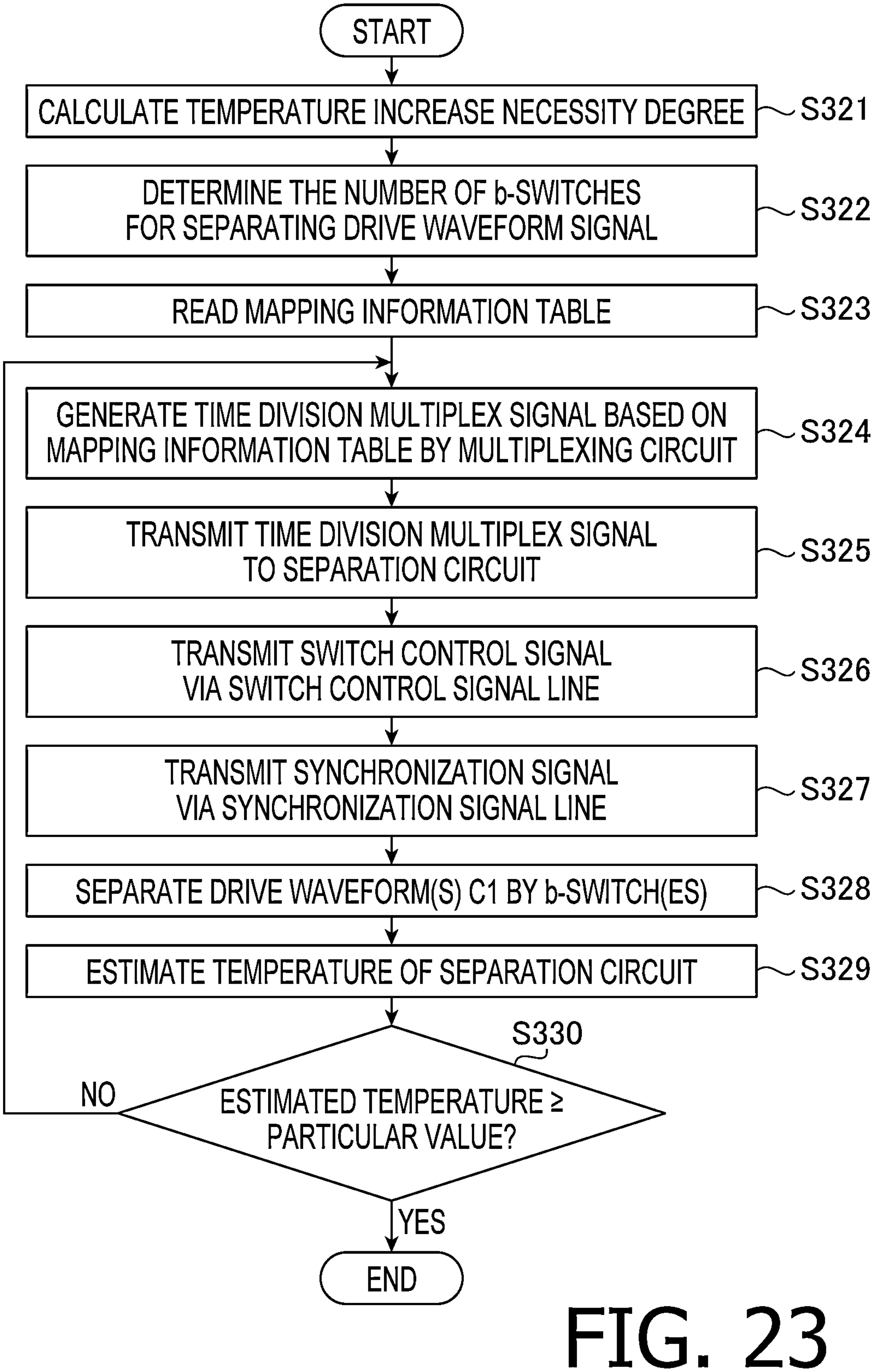
FIG. 23 is a flowchart showing a procedure of a temperature increase process by the controller.

FIG. 23 is a flowchart showing a procedure of a temperature increase process by the controller 50 in the third illustrative embodiment. The controller 50 calculates a temperature increase necessity degree of the ink identified in the print job, based on the ink table 552 and the temperature increase score table 554 (S321). Based on the temperature increase necessity degree, the controller 50 refers to the temperature increase degree table 555 and determines the number of b-switches **54*b* for separating the drive waveform signal (S322). A process of S323 to S325 in FIG. 23 is substantially the same as the process of S302 to S304 in FIG. 11**.

The controller 50 transmits a switch control signal from the control circuit 51 to the separation circuit **50*b* via the switch control signal line SL1 (S326). The switch control signal transmitted in S326 includes first selection information and second selection information. The first selection information indicates the selection of b-switch(es) 54*b*. The second selection information indicates the selection of the synchronization signal S2*c*. In the third illustrative embodiment, when the number of b-switches 54*b* determined in S322 is one, the first selection information indicates the selection of a b1-switch 54*b*1. When the number of b-switches 54*b* is two, the first selection information indicates the selection of a b1-switch 54*b*1 and a b2-switch 54*b*2. When the number of b-switches 54*b* is three, the first selection information indicates the selection of a b1-switch 54*b*1, a b2-switch 54*b*2, and a b3-switch 54*b*3. It is noted that the b-switch(es) 54*b* indicated by the first selection information for the number of b-switches 54*b* may not necessarily be fixed. For instance, the b-switch(es) 54*b* indicated by the first selection information may be determined in an ascending order of the number of times that each b-switch 54*b* has separated the drive waveform signals in the past, in rotation, or in random order. When the number of b-switches 54***b* determined in S322 is 0, the controller 50 terminates the temperature increase process without executing S326 to S330.

The controller 50 transmits the synchronization signal S2 from the control circuit 51 to the separation circuit 50*b* via the synchronization signal line SL2 (S327). The controller 50 separates the drive waveform(s) C1 by the b-switch(es) 54*b* indicated by the first selection information of the switch control signal (S328). A process of S329 to S330 in FIG. 23 is substantially the same as the process of S308 to S309 in FIG. 11.

In the printing apparatus 1 in the third illustrative embodiment, the controller 50 determines the number of b-switches 54*b* for separating the drive waveform signal based on the ink (liquid) to be ejected from the nozzles 80, thereby controlling the increase in temperature of the separation circuit 50*b* according to the properties of the ink. This makes it possible to achieve both maintaining the quality of liquid discharge by the nozzle 80 at a constant level and suppressing the properties of the ink (liquid) from changing with an increase in temperature. The b1-switch 54*b*1, the b2-switch 54*b*2, and the b3-switch 54*b*3 may be configured to separate the drive waveform A1 or B1. The temperature increase score table 554 and the temperature increase degree table 555 may be stored in the external device 100. The print job may include information indicating the number of b-switches 54*b* for separating the drive waveform signal before the ink identified in the print job is ejected from the nozzles 80.

Fourth Illustrative Embodiment

In a printing apparatus 1 in a fourth illustrative embodiment according to aspects of the present disclosure, the time division multiplex signal includes signals indicating a plurality of waveforms for increasing, when separated by the switch 54, the temperature of the separation circuit 50*b*. A controller 50 determines a drive waveform to be separated by the switch 54 according to the properties of the ink (liquid) to be ejected from the nozzles 80. A technical concept according to aspects of the present disclosure will be described below with reference to relevant drawing(s) illustrating the printing apparatus 1 in the fourth illustrative embodiment. Among elements in the fourth illustrative embodiment, elements having substantially the same configurations as in the aforementioned first illustrative embodiment, the aforementioned second illustrative embodiment, and/or the aforementioned third illustrative embodiment will be provided with the same reference characters, and detailed explanations thereof may be omitted.

Figure 24:
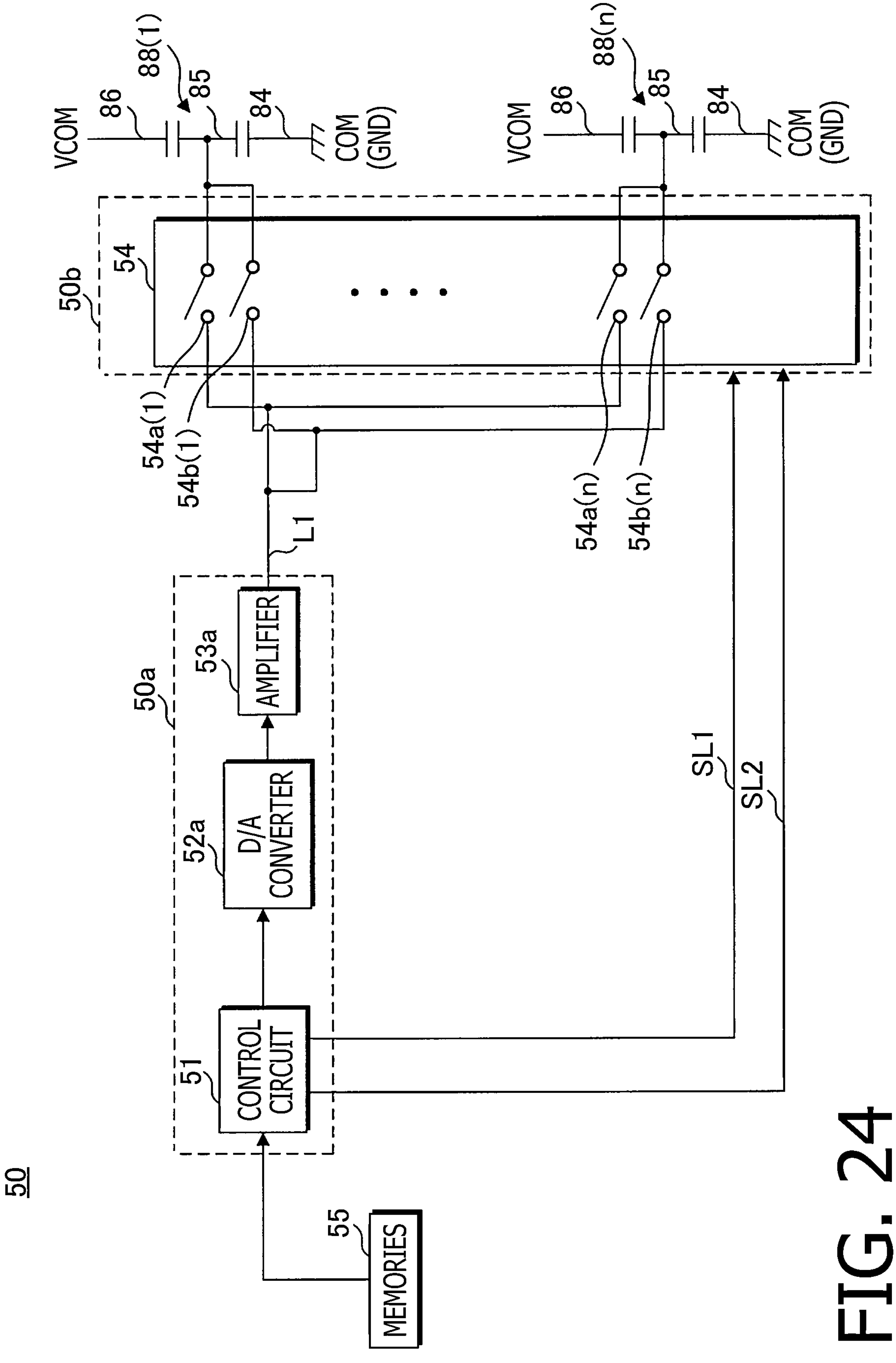
FIG. 24 is a block diagram showing an electrical configuration of a controller of a printing apparatus.

FIG. 24 is a block diagram showing an electrical configuration of the controller 50 in the fourth illustrative embodiment. The configuration of the controller 50 in the fourth illustrative embodiment is substantially the same as in the aforementioned second illustrative embodiment.

Figure 25:
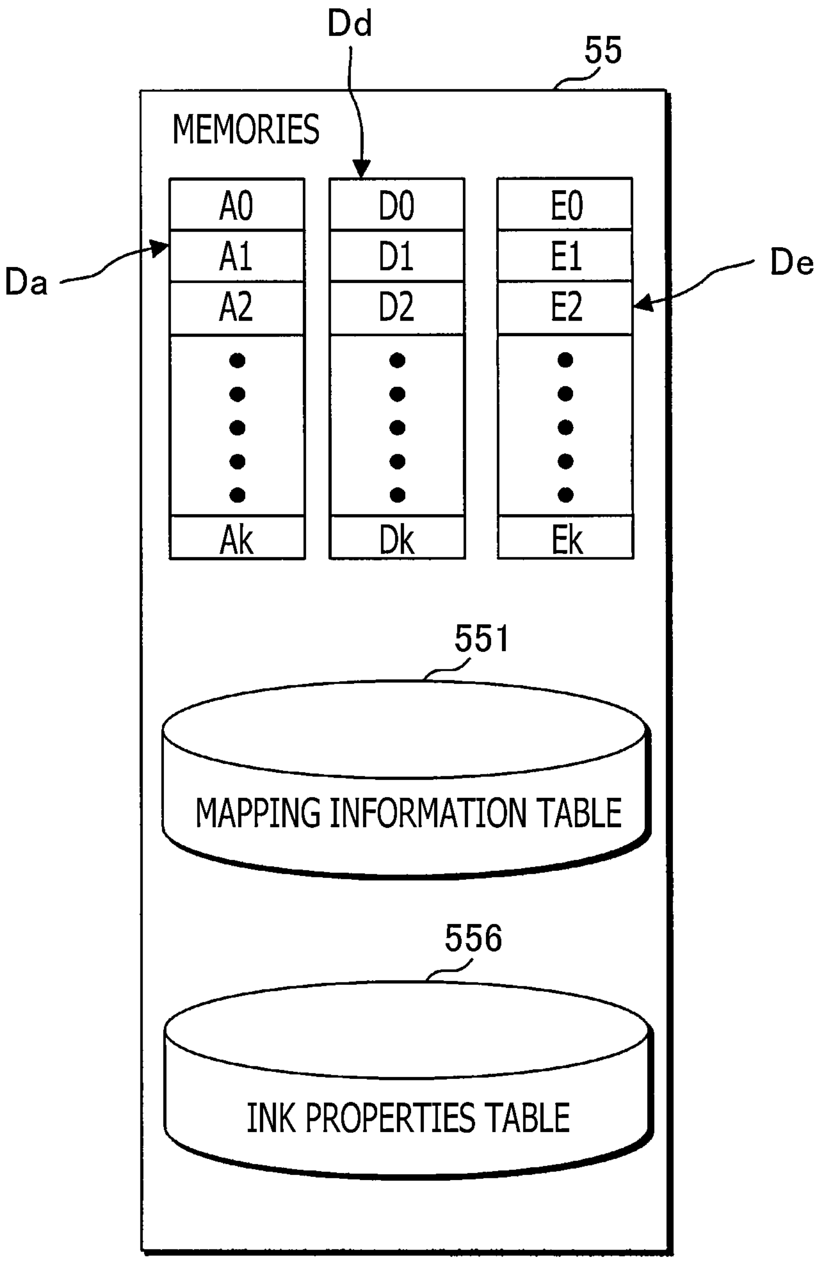
FIG. 25 is a block diagram showing drive waveform data and tables that are stored in one or more memories of the printing apparatus.

FIG. 25 is a block diagram showing drive waveform data and tables stored in one or more memories 55 in the fourth illustrative embodiment. In the fourth illustrative embodiment, the one or more memories 55 store a plurality of pieces of drive waveform data Da, Dd, and De. The one or more memories 55 further stores a mapping information table 551 and an ink properties table 556. The mapping information table 551 and the ink properties table 556 in the fourth illustrative embodiment will be described in detail later.

Figure 26:
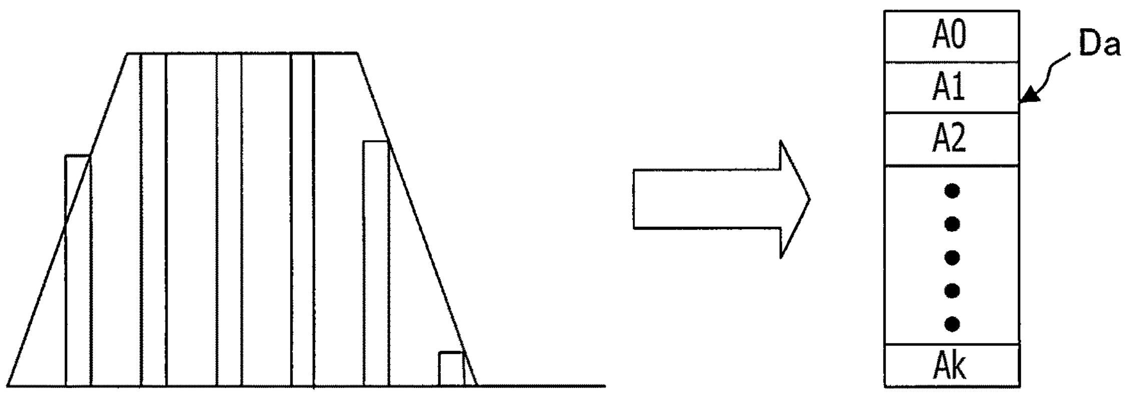
FIG. 26 shows an example of a relationship between drive waveforms A, D, and E and drive waveform data Da, Dd, and De.
Figure 26:
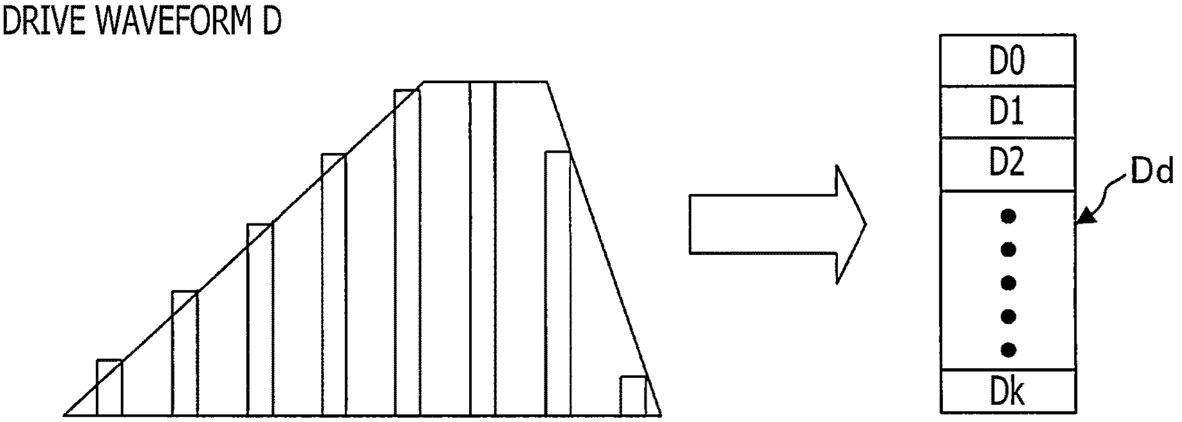
Figure 26:
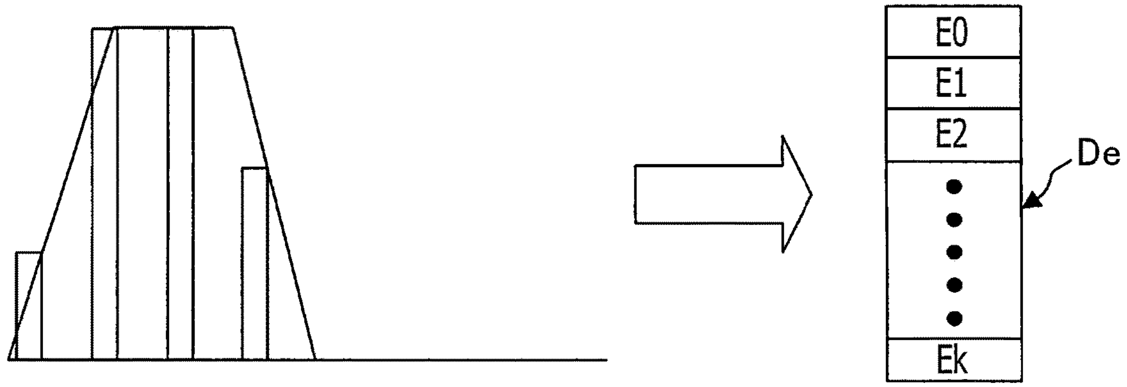

FIG. 26 shows an example of a relationship between drive waveforms A, D, and E and the drive waveform data Da, Dd, and De. The drive waveform data Da is obtained by converting the drive waveform A into a digital signal at a particular sampling cycle. The drive waveform data Dd is obtained by converting the drive waveform D into a digital signal at the particular sampling cycle. The drive waveform data De is obtained by converting the drive waveform E into a digital signal at the particular sampling cycle.

The drive waveform data Da is quantized data of the drive waveform A. The drive waveform data Dd is quantized data of the drive waveform D. The drive waveform data De is quantized data of the drive waveform E. The drive waveform data Da has quantized data Aj (j=0, 1, 2, . . . , k). The drive waveform data Dd has quantized data Dj. The drive waveform data De has quantized data Ej.

FIG. 27 shows an example of the mapping information table 551 in the fourth illustrative embodiment. An "allocation data" field of the mapping information table 551 in the fourth illustrative embodiment stores a data name of data Aj, Dj, or Ej (j=0, 1, 2, . . . , k) allocated to each time slot. Each data name [Aj] in FIG. 27 corresponds to the data Aj shown in FIG. 26. Each data name [Dj] in FIG. 27 corresponds to the data Dj shown in FIG. 26. Each data name [Ej] in FIG. 27 corresponds to the data Ej shown in FIG. 26.

Figure 28:
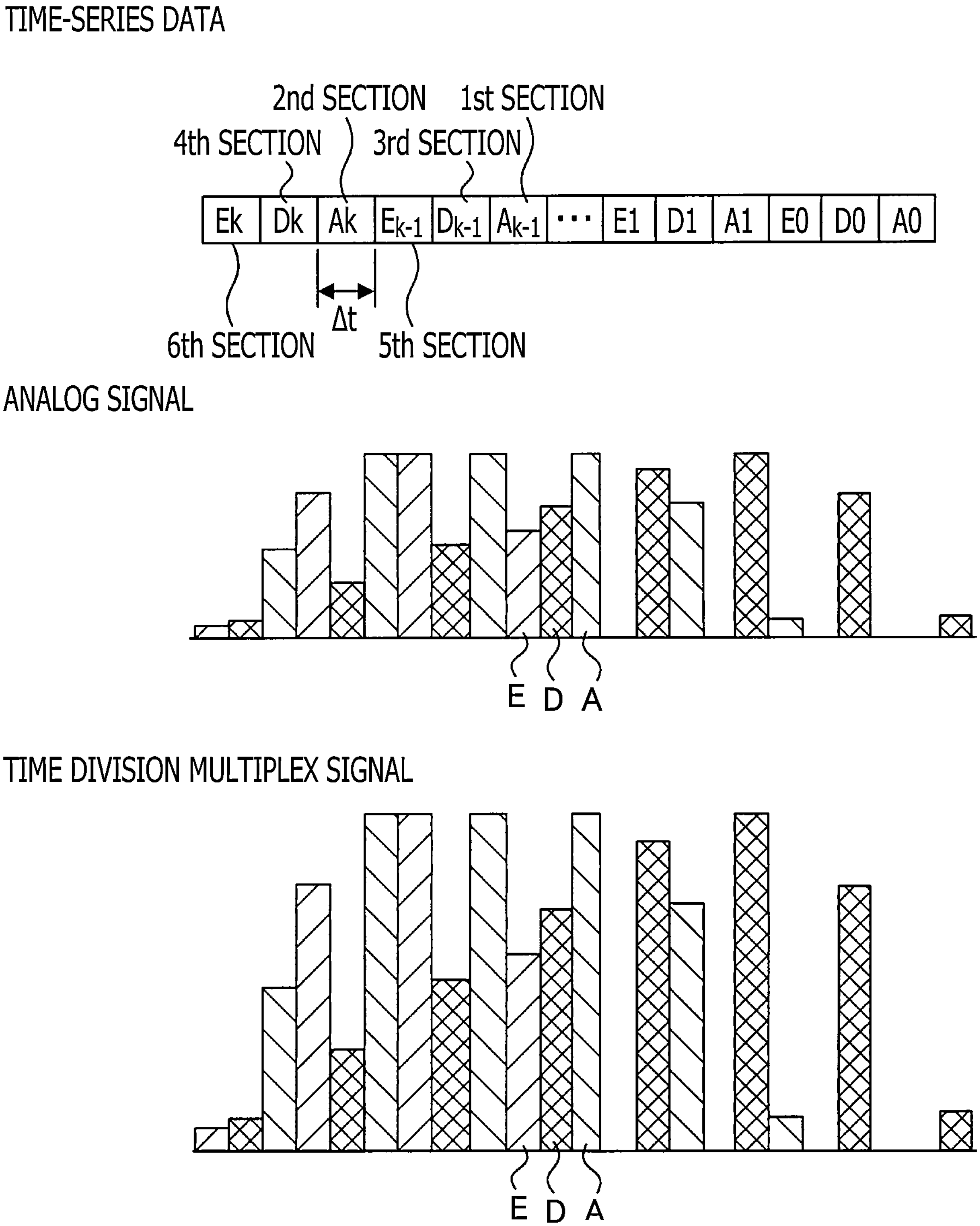
FIG. 28 illustrates examples of time-series data, an analog signal, and a time division multiplex signal.

FIG. 28 illustrates examples of time-series data, an analog signal, and a time division multiplex signal. In FIGS. 28, A, D, and E indicate that they correspond to the drive waveforms A, D, and E, respectively. To drive the actuators 88, the control circuit 51 accesses the one or more memories 55 to read out the drive waveform data Da, Dd, and De and the mapping information table 551, thereby generating time-series data. The time-series data is the data Aj, Dj, and Ej allocated based on the mapping information table 551 to corresponding time slots, respectively, of the plurality of time slots into which a particular time frame is divided at each time interval Δt. In other words, the time-series data is the data Aj, Dj, and Ej (j=0, 1, 2, . . . , k) arranged in order at each time interval Δt, i.e., in the order of A0, D0, E0, A1, D1, E1, . . . , Ak, Dk, Ek. The time-series data is a digital signal. A time interval between the starting ends of Ak−1 and Ak, a time interval between the starting ends of Dk-1 and Dk, and a time interval between the starting ends of Ek−1 and Ek are all 3Δt.

The control circuit 51 outputs the time-series data to the D/A converter 52. As shown in FIG. 28, the D/A converter 52 converts the time-series data into an analog signal and outputs the analog signal to the amplifier 53. The amplifier 53 amplifies the input analog signal and outputs the amplified analog signal to the switch group 54. As shown in FIG. 28, the analog signal amplified by the amplifier 53 constitutes the time division multiplex signal. In the time division multiplex signal, suppose for instance that a section corresponding to the data Ak−1 is a first section, a section corresponding to the data Ak is a second section, a section corresponding to data Dk-1 is a third section, a section corresponding to the data Dk is a fourth section, a section corresponding to data Ek−1 is a fifth section, and a section corresponding to the data Ek is a sixth section. In this case, the third section is between the first section and the second section. The second section is between the third section and the fourth section. The fifth section is between the third section and the second section. The fourth section is between the second section and the sixth section.

Figure 29:
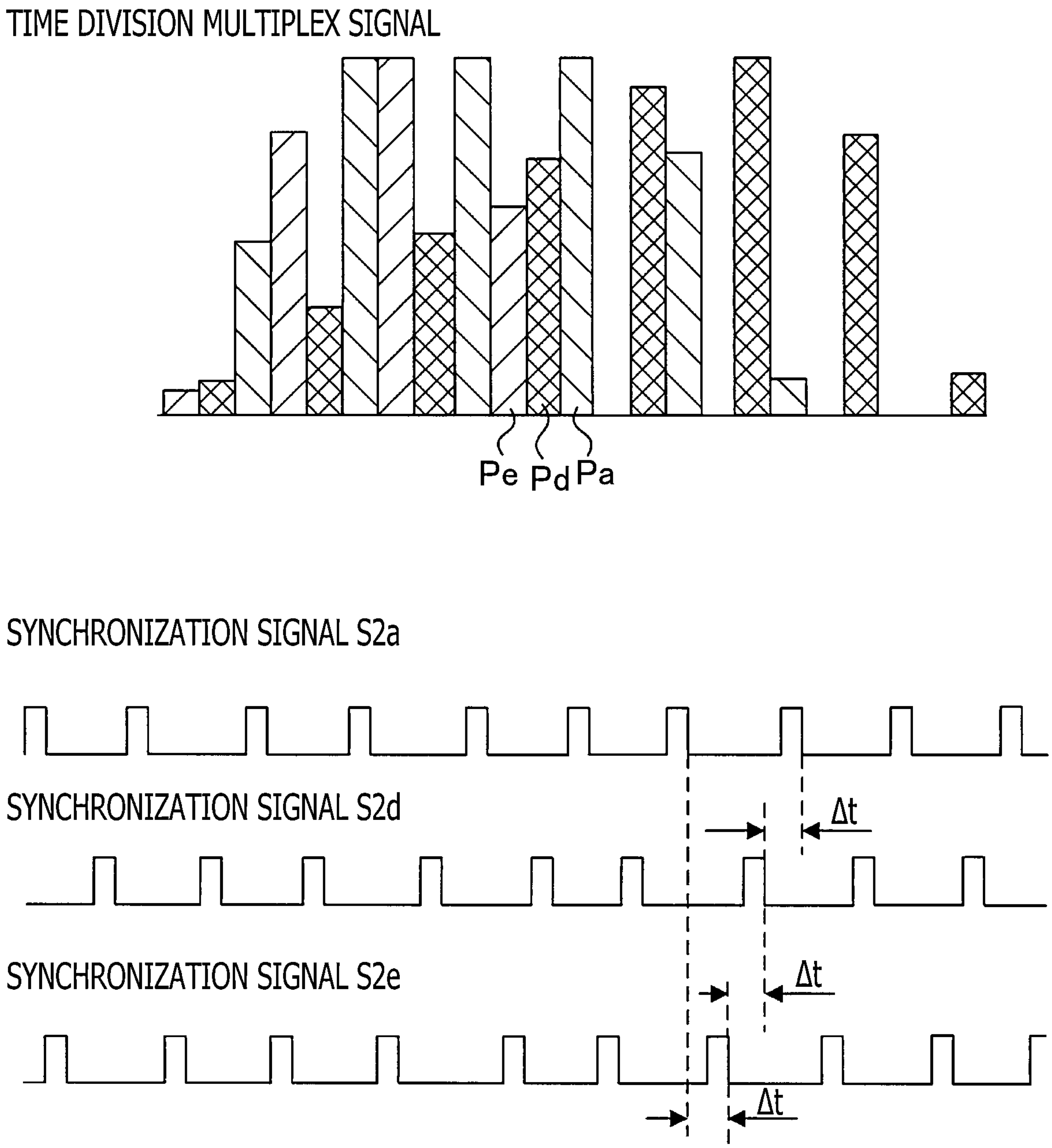
FIG. 29 illustrates a relationship between the time division multiplex signal and synchronization signals S2*a*, S2*d* and S2*e*.

FIG. 29 illustrates a relationship between the time division multiplex signal and the synchronization signals S2*a*, S2*d* and S2*e*. The synchronization signals S2*a*, S2*d* and S2*e* are pulse waves. The time interval Δt is provided between a point of time (i.e., a rising edge) at which a pulse of the synchronous signal S2*a* rises and a point of time (i.e., a rising edge) at which a corresponding pulse of the synchronous signal S2*d* rises. The time interval Δt is provided between the rising edge of the pulse of the synchronous signal S2*d* and a rising edge of a corresponding pulse of the synchronous signal S2*e*. The time interval Δt is provided between the rising edge of the pulse of the synchronizing signal S2*e* and the rising edge of the pulse of the synchronizing signal S2*a*. As shown in FIG. 29, a time width over which the pulse rises in each of the synchronization signals S2*a*, S2*d*, and S2*e* is narrower than the time width (i.e., the time interval Δt) of each time slot, but may be the same as the time width (i.e., the time interval Δt) of each time slot. Namely, the time width over which the pulse rises in each of the synchronization signals S2*a*, S2*d*, and S2*e* is within the time width (i.e., the time interval Δt) of each time slot. The synchronization signals S2*a*, S2*d*, and S2*e* are transmitted via the synchronization signal line SL2.

As described above, the data Aj, Dj, and Ej, which constitute the time-series data, are arranged in sequence at the time interval Δt. Therefore, by accessing the time division multiplex signal at the rising edge of each pulse of the synchronization signal S2*a*, it is possible to obtain the drive waveform signal Pa that corresponds to the data Aj and indicates the drive waveform A. By accessing the time division multiplex signal at the rising edge of each pulse of the synchronization signal S2*d*, it is possible to obtain the drive waveform signal Pd that corresponds to the data Dj and indicates the drive waveform D. By accessing the time division multiplex signal at the rising edge of each pulse of the synchronization signal S2*c*, it is possible to obtain the drive waveform signal Pe that corresponds to the data Ej and indicates the drive waveform E.

The switch group 54 opens and closes an n-th a-switch 54*a*(n) or an n-th b-switch 54*b*(n) that is specified by the first selection information, at the open-close timing indicated by a specific one of the synchronization signals S2*a*, S2*d*, and S2*e* that is specified by the second selection information contained in the transmitted switch control signal.

Figure 30:
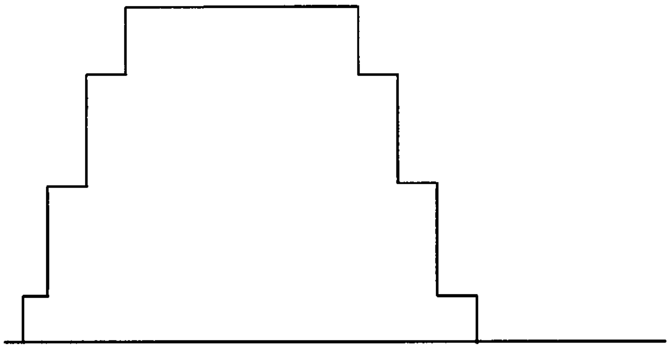
FIG. 30 schematically shows examples of a drive waveform input into a corresponding actuator by opening and closing an n-th a-switch or an n-th b-switch.
Figure 30:
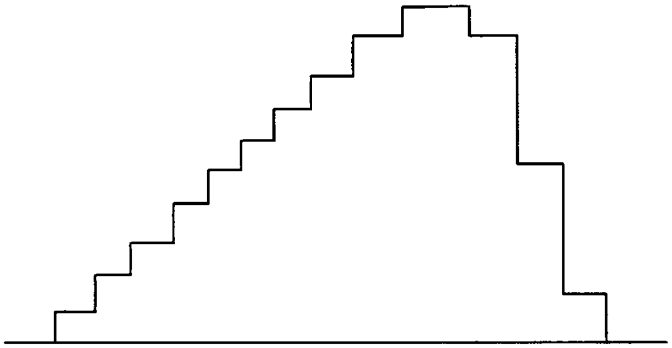
Figure 30:
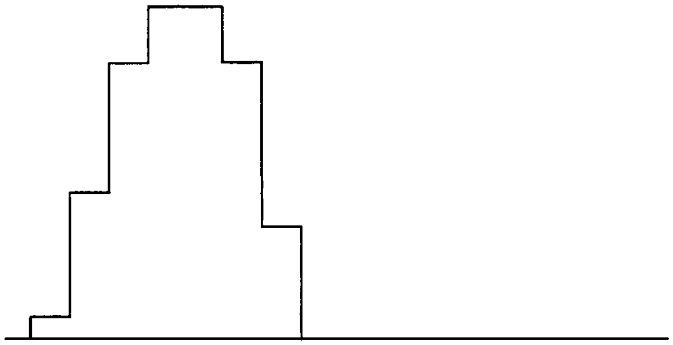

FIG. 30 schematically shows examples of the drive waveform input into a corresponding actuator 88 by opening and closing the specified one of the n-th a-switch 54*a*(n) and the n-th b-switch 54*b*(n). When the time division multiplex signal and the synchronization signal S2*a* are selected, the switch group 54 closes the n-th a-switch 54*a*(n) when the pulse of the synchronization signal S2*a* is in the high-level section, and opens the n-th a-switch 54*a*(n) when the pulse of the synchronization signal S2*a* is in the low-level section. The charge, applied to a corresponding individual electrode 85 when the n-th a-switch 54*a*(n) is closed, is retained, and the drive waveform A1 (see FIG. 30) is input into the actuator 88. In other words, the drive waveform signal Pa is separated from the time division multiplex signal, and the actuator 88 is driven by the drive waveform signal Pa. In the fourth illustrative embodiment, the drive waveform A1 may correspond to the "first drive waveform" according to aspects of the present disclosure. The drive waveform signal Pa may correspond to the "first drive waveform signal" according to aspects of the present disclosure. Based on the drive waveform signal Pa, a corresponding nozzle 80 is driven to eject liquid.

When the time division multiplex signal and the synchronization signal S2*d* are selected, the switch group 54 closes the n-th b-switch 54*b*(n) when the pulse of the synchronization signal S2*d* is in the high-level section, and opens the n-th b-switch 54*b*(n) when the pulse of the synchronization signal S2*d* is in the low-level section. The charge, applied to the corresponding individual electrode 85 when the n-th b-switch 54*b*(n) is closed, is retained, and the drive waveform D1 (see FIG. 30) is input into the actuator 88. In other words, the drive waveform signal Pd is separated from the time division multiplex signal, and the actuator 88 is driven by the drive waveform signal Pd. In the fourth illustrative embodiment, the drive waveform D1 may correspond to the "second drive waveform" according to aspects of the present disclosure. The drive waveform signal Pd may correspond to the "second drive waveform signal" according to aspects of the present disclosure. The corresponding nozzle 80 is driven based on the drive waveform signal Pd, and the temperature of the separation circuit 50*b* (i.e., the switch group 54) is increased. At this time, the corresponding nozzle 80 does not eject liquid. Namely, the nozzle 80 is driven to not eject liquid based on the drive waveform signal Pd.

When the time division multiplex signal and the synchronization signal S2*e* are selected, the switch group 54 closes the n-th b-switch 54*b*(n) when the pulse of the synchronization signal S2*e* is in the high-level section, and opens the n-th b-switch 54*b*(n) when the pulse of the synchronization signal S2*e* is in the low-level section. The charge, applied to the corresponding individual electrode 85 when the n-th b-switch 54*b*(n) is closed, is retained, and the drive waveform E1 (see FIG. 30) is input into the actuator 88. In other words, the drive waveform signal Pe is separated from the time division multiplex signal, and the actuator 88 is driven by the drive waveform signal Pe. In the fourth illustrative embodiment, the drive waveform E1 may correspond to a "third drive waveform" according to aspects of the present disclosure. The drive waveform signal Pe may correspond to a "third drive waveform signal" according to aspects of the present disclosure. The corresponding nozzle 80 is driven based on the drive waveform signal Pe, and the temperature of the separation circuit 50*b* (i.e., the switch group 54) is increased. At this time, the corresponding nozzle 80 does not eject liquid. Namely, the nozzle 80 is driven to not eject liquid based on the drive waveform signal Pe.

In the fourth illustrative embodiment, a voltage application time per cycle of the drive waveform D1 is longer than a voltage application time per cycle of the drive waveform E1. When the b-switch 54*b* separates the drive waveform signal Pd, a degree of heat generation is greater, and the temperature of the separation circuit 50*b* is increased higher, than when the b-switch 54*b* separates the drive waveform signal Pe. It is noted that an amplitude of the drive waveform D1 may be larger than an amplitude of the drive waveform E1, and that a frequency of the drive waveform D1 may be higher than a frequency of the drive waveform E1. In any of the above cases, when the b-switch 54*b* separates the drive waveform signal Pd, the degree of heat generation is greater, and the temperature of the separation circuit 50*b* is increased higher, than when the b-switch 54*b* separates the drive waveform signal Pe.

FIG. 31 shows an example of the ink properties table 556. The ink properties table 556 stores information regarding the classification of the properties of the ink to be ejected from the nozzles 80. Fields for management items of the ink properties table 556 include, for instance, an "ink name" field, a "specific heat" field, and a "properties" field. The "ink name" field stores an ink name for identifying each type of ink. The "specific heat" field stores a specific heat of each type of ink. The "properties" field stores a type of properties according to the specific heat of each type of ink. Specifically, for instance, the "properties" field stores first properties for a type of ink having a specific heat that is equal to or higher than 4.00 J/(g-K). Further, the "properties" field stores second properties for a type of ink having a specific heat that is less than 4.00 J/(g-K).

When the ink identified in the print job has the first properties, the controller 50 causes the b-switch 54*b* to separate the drive waveform signal Pd. When the ink identified in the print job has the second properties, the controller 50 causes the b-switch 54*b* to separate the drive waveform signal Pe. The ink properties table 556 may include, instead of or in addition to the "specific heat" field, a "resin particle" field, an "organic solvent having saturated vapor pressure of 0.03 hPa or higher" field, a "colorant solid content" field, an "average pigment particle size" field, a "water" field, or a "heat transfer coefficient" field. In this case, the "properties" field may store a type of properties according to a ratio (mass %) of resin particles contained in each type of ink, a ratio (mass %) of organic solvent, contained in each type of ink, having a saturated vapor pressure of 0.03 hPa or higher at 20° C., a ratio (mass %) of a colorant solid content in each type of ink, an average particle size (nm) of pigment particles contained in each type of ink, a ratio (mass %) of water contained in each type of ink, or a heat transfer coefficient of each type of ink. The ink properties table 556 may be stored in the external device 100. The print job may include information indicating the properties of the ink to be ejected from the nozzles 80.

Figure 32:
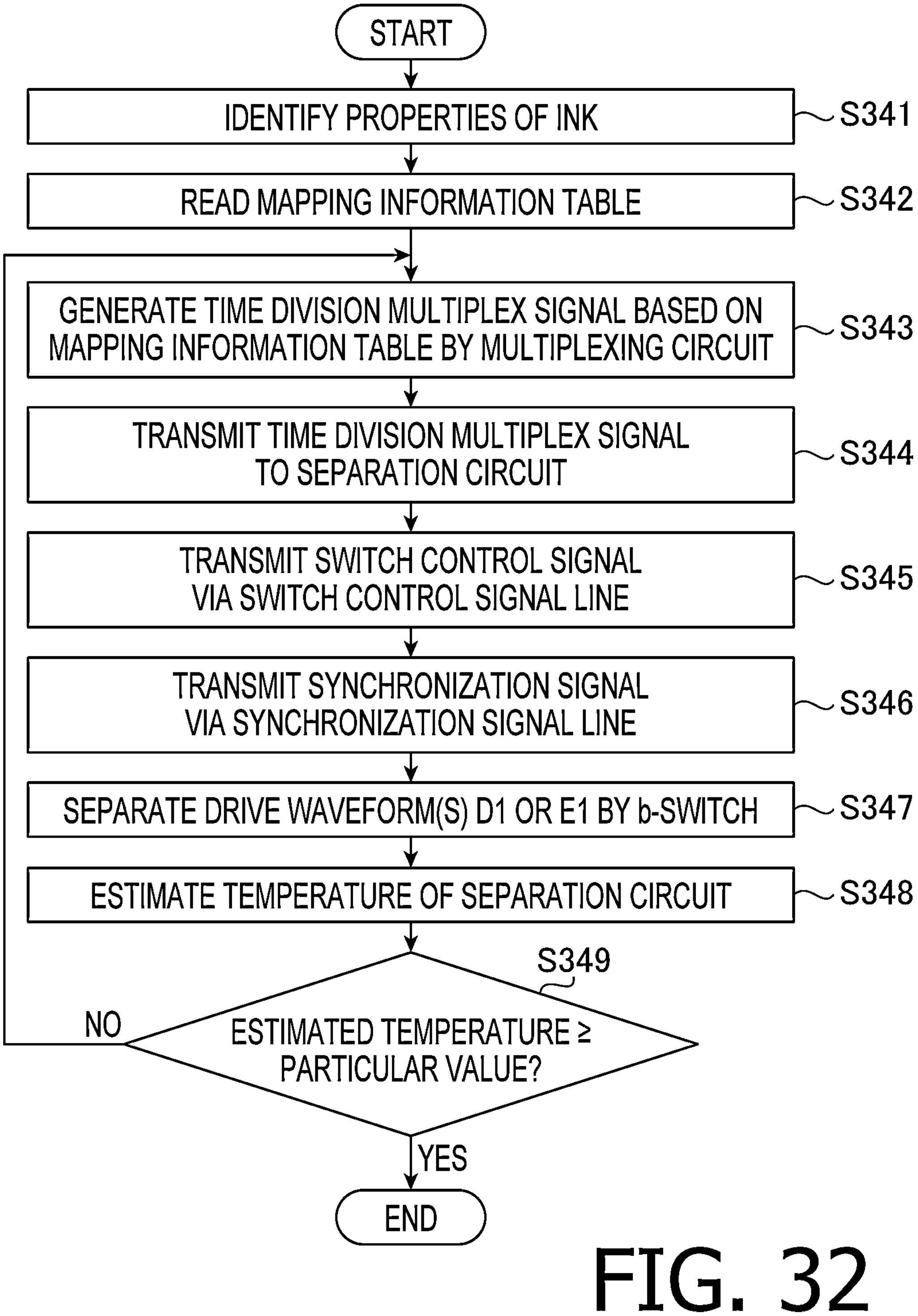
FIG. 32 is a flowchart showing a procedure of a temperature increase process by the controller.

FIG. 32 is a flowchart showing a procedure of a temperature increase process by the controller 50 in the fourth illustrative embodiment. Based on the ink name of the ink identified in the print job, the controller 50 identifies the properties of the ink to be ejected from the nozzles 80 with reference to the ink properties table 556 (S341). A process of S342 to S344 in FIG. 32 is substantially the same as the process of S302 to S304 in FIG. 11. The controller 50 transmits a switch control signal from the control circuit 51 to the separation circuit 50*b* via the switch control signal line SL1 (S345). The switch control signal transmitted in S345 includes first selection information and second selection information. The first selection information indicates the selection of a b-switch 54*b*. The second selection information indicates the selection of a synchronization signal S2. In the fourth illustrative embodiment, when the properties of the ink have been identified as the first properties in S341, the second selection information indicates the selection of the synchronization signal S2*d*. When the properties of the ink have been identified as the first properties in S341, the second selection information indicates the selection of the synchronization signal S2*e*. The controller 50 transmits the synchronization signal S2 from the control circuit 51 to the separation circuit 50*b* via the synchronization signal line SL2 (S346). The controller 50 separates the drive waveform(s) D1 or E1 by the b-switch 54*b* of the separation circuit 50*b* (S347). A process for S348 to S349 in FIG. 32 is substantially the same as the process of S308 to S309 in FIG. 11.

Modification of Fourth Illustrative Embodiment

In a modification of the fourth illustrative embodiment, the controller 50 determines a drive waveform signal to be separated by the b-switch 54*b* based on the position of each nozzle 80 to eject ink.

Figure 33:
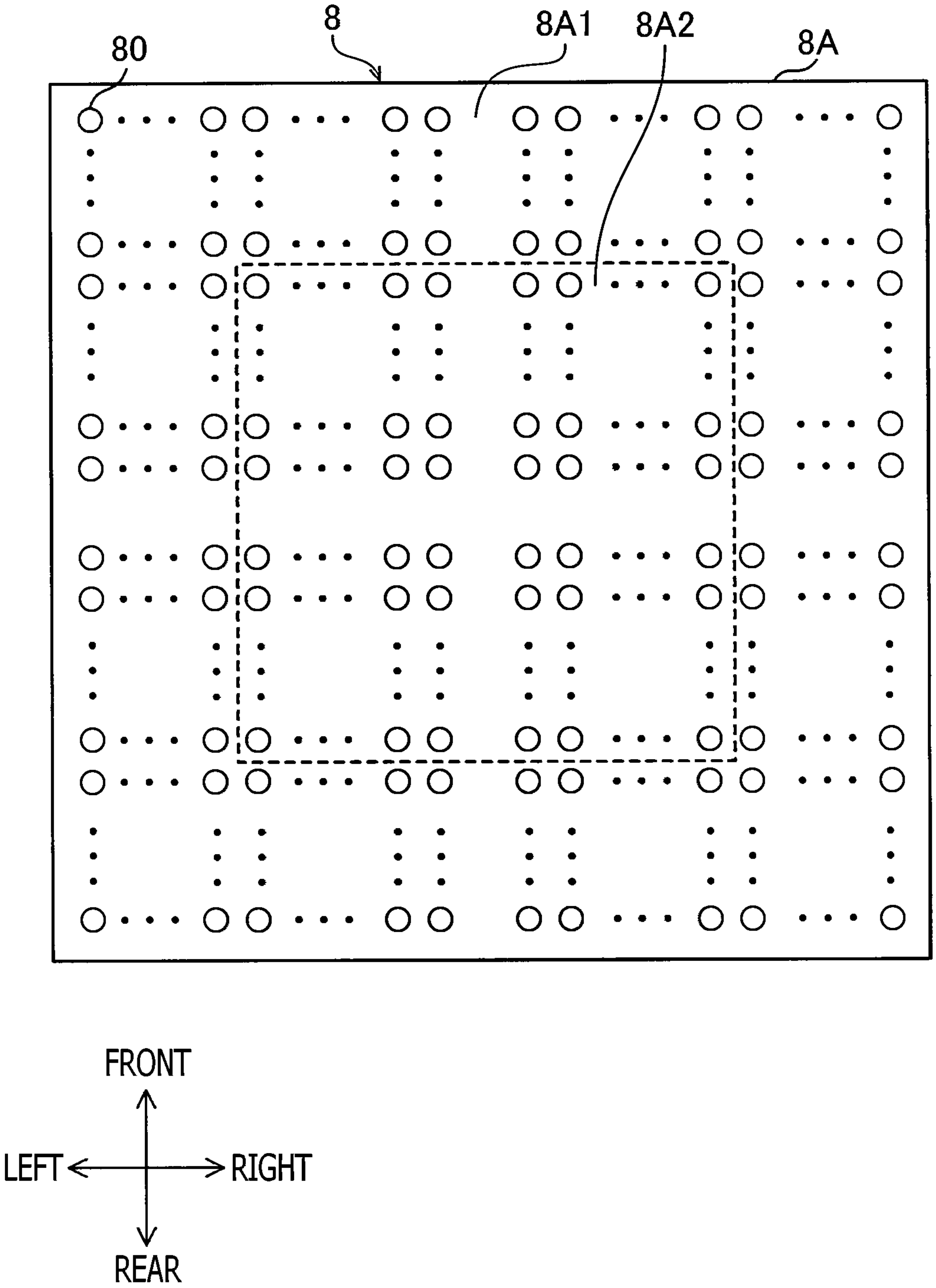
FIG. 33 shows an example of nozzle positions in inkjet heads.

FIG. 33 shows an example of the positions of the nozzles 80 in the inkjet heads 8. The inkjet heads 8 include the plurality of nozzles 80 arranged at regular intervals along the front-rear directions and the left-right directions. As described above and shown in FIG. 1, the conveyance direction is along the front-rear directions (i.e., the frontward direction and the rearward direction). Further, the scanning directions are along the left-right directions (i.e., the leftward direction and the rightward direction). In FIG. 33, for the sake of simplicity, the reference numeral "80" is provided to only one of the nozzles 80.

Each inkjet head 8 has a nozzle surface 8A. The nozzle surface 8A has a first area 8A1 and a second area 8A2. As shown in FIG. 33, the first area 8A1 is located outside the second area 8A2 surrounded by a dashed line, within the nozzle surface 8A. Namely, the second area 8A2 is closer to a center of the nozzle surface 8A in the front-rear directions and the left-right directions than the first area 8A1 is. A ratio of the number of nozzles 80 in the first area 8A1 to the number of nozzles 80 in the second area 8A2 may be set arbitrarily. In other words, the second area 8A2 may be set arbitrarily as long as the first area 8A1 is located outside the second area 8A2 within the nozzle surface 8A. The controller 50 stores information indicating whether each nozzle 80 is in the first area 8A1 or in the second area 8A2, in association with a number "n" assigned to each nozzle 80. The number "n" also represents the number "n" assigned to a corresponding actuator 88 for each nozzle 80.

When a nozzle 80 in the first area 8A1 ejects ink (liquid), the controller 50 causes a corresponding b-switch 54*b* to separate the drive waveform signal Pd. Meanwhile, when the nozzle 80 in the second area 8A2 ejects ink (liquid), the controller 50 causes the corresponding b-switch 54*b* to separate the drive waveform signal Pe. The drive waveform signal Pd may correspond to the "second drive waveform signal" according to aspects of the present disclosure. The drive waveform signal Pe may correspond to the "third drive waveform signal" according to aspects of the present disclosure. As described above, when the b-switch 54*b* separates the drive waveform signal Pd, the degree of heat generation is greater, and the temperature of the separation circuit 50*b* is increased higher, than when the b-switch 54*b* separates the drive waveform signal Pe. Namely, the controller 50 causes the b-switch 54*b* to separate the drive waveform signal Pd in such a manner that when an outside nozzle 80 (i.e., a nozzle 80 in the first area 8A1), of which the temperature is unlikely to easily increase, ejects ink, the degree of heat generation is greater than when an inside nozzle 80 (i.e., a nozzle 80 in the second area 8A2), of which the temperature is likely to easily increase, ejects ink.

Figure 34:
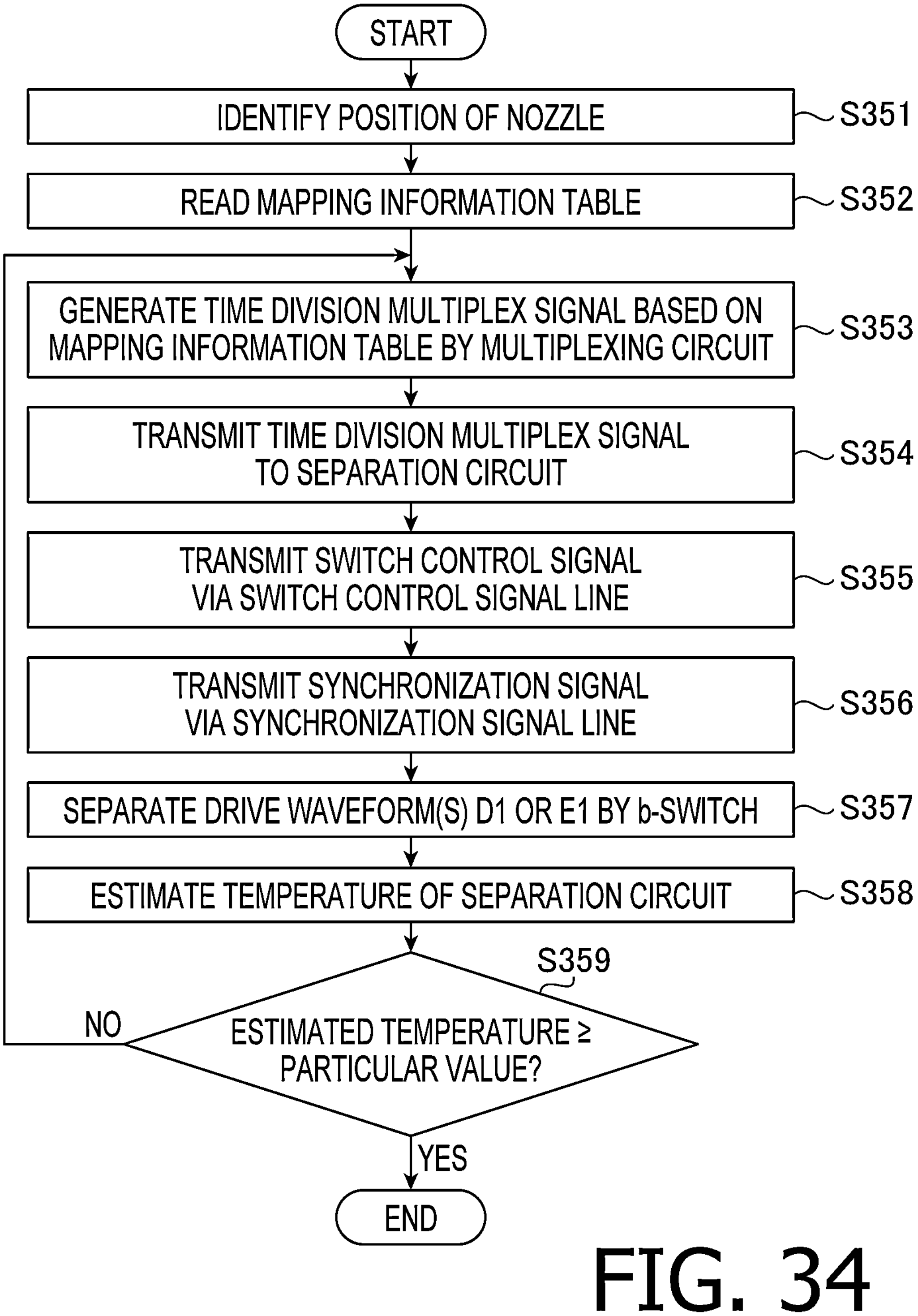
FIG. 34 is a flowchart showing a procedure of a temperature increase process by the controller.

FIG. 34 is a flowchart showing a procedure of a temperature increase process by the controller 50 in the modification of the fourth illustrative embodiment. Based on the number "n" of a nozzle 80 to eject ink that is specified in the print job, the controller 50 identifies the position of the nozzle 80 (S351). A process of S352 to S359 in FIG. 34 is substantially the same as the process of S342 to S349 in FIG. 32. The switch control signal transmitted in S355 includes first selection information and second selection information. The first selection information indicates the selection of a b-switch 54*b*. The second selection information indicates the selection of a synchronization signal S2. In the modification of the fourth illustrative embodiment, when the position of the nozzle 80 is identified as a position in the first area 8A1 in S341, the second selection information indicates the selection of the synchronization signal S2*d*. When the position of the nozzle 80 is identified as a position in the second area 8A2 in S341, the second selection information indicates the selection of the synchronization signal S2*e*.

In the fourth illustrative embodiment, the printing apparatus 1 determines the drive waveform signal to be separated by the b-switch 54*b* based on the properties of the ink (liquid) to be ejected from the nozzle 80 or based on the position of the nozzle 80 that ejects ink (liquid), thereby controlling the increase in temperature of the separation circuit 50*b* according to the properties of the ink or how easily the temperature of the separation circuit 50*b* is likely to increase. This makes it possible to maintain the quality of liquid ejection from the nozzle 80 at a constant level.

While aspects of the present disclosure have been described in conjunction with various example structures outlined above and illustrated in the drawings, various alternatives, modifications, variations, improvements, and/or substantial equivalents, whether known or that may be presently unforeseen, may become apparent to those having at least ordinary skill in the art. Accordingly, the example embodiment(s), as set forth above, are intended to be illustrative of the technical concepts according to aspects of the present disclosure, and not limiting the technical concepts. Various changes may be made without departing from the spirit and scope of the technical concepts according to aspects of the present disclosure. Therefore, the disclosure is intended to embrace all known or later developed alternatives, modifications, variations, improvements, and/or substantial equivalents.

The following shows examples of associations between elements illustrated in the aforementioned illustrative embodiment(s) and modification(s), and elements claimed according to aspects of the present disclosure. For instance, the printing apparatus 1 may be an example of a "printing apparatus" according to aspects of the present disclosure. Each of the nozzles 80 may be an example of a "nozzle" according to aspects of the present disclosure. The controller 50 may be an example of a "controller" according to aspects of the present disclosure. The multiplexing circuit 50*a* may be an example of a "multiplexing circuit" according to aspects of the present disclosure. The separation circuit 50*b* may be an example of a "separation circuit" according to aspects of the present disclosure. Each of the ink chambers 71 may be an example of a "liquid chamber" according to aspects of the present disclosure. The circulation pump 10 may be an example of a "circulation pump" according to aspects of the present disclosure.

What is claimed is:

1. A printing apparatus comprising:

a print head including a nozzle and an actuator, the print head being configured to eject liquid from the nozzle when the actuator is driven by a drive signal; and a controller including:

a multiplexing circuit configured to generate a time division multiplex signal based on first data and second data, the time division multiplex signal enabling the first data and the second data to be transmitted via a single signal line, the first data representing a first drive waveform, the first drive waveform having a first section and a second section, the second data representing a second drive waveform different from the first drive waveform, the second drive waveform having a third section and a fourth section, the time division multiplex signal being generated with the first to fourth sections arranged in such a manner that the third section is between the first section and the second section, and the second section is between the third section and the fourth section; and a separation circuit configured to receive the time division multiplex signal from the multiplexing circuit, the separation circuit including one or more switches configured to separate a first drive waveform signal or a second drive waveform signal from the time division multiplex signal based on a synchronization signal, the first drive waveform signal indicating the first drive waveform, the second drive waveform signal indicating the second drive waveform, wherein the controller is configured to:

cause the one or more switches to separate the first drive waveform signal from the time division multiplex signal, and drive the actuator to cause the nozzle to eject the liquid based on the first drive waveform signal; and cause the one or more switches to separate the second drive waveform signal from the time division multiplex signal, and drive the actuator without causing the nozzle to eject the liquid based on the second drive waveform signal, thereby increasing a temperature of the separation circuit.

2. The printing apparatus according to claim 1, wherein the one or more switches include an a-switch and a b-switch, and wherein the controller is further configured to:

cause the a-switch to separate the first drive waveform signal from the time division multiplex signal, and drive the actuator to cause the nozzle to eject the liquid based on the first drive waveform signal; and cause the b-switch to separate the second drive waveform signal from the time division multiplex signal, and drive the actuator without causing the nozzle to eject the liquid based on the second drive waveform signal, thereby increasing the temperature of the separation circuit.

3. The printing apparatus according to claim 2, wherein the one or more switches include a plurality of the b-switches.

4. The printing apparatus according to claim 2, wherein a resistance value of the b-switch is different from a resistance value of the a-switch.

5. The printing apparatus according to claim 1, wherein the controller is further configured to cause the one or more switches to separate the second drive waveform signal from the time division multiplex signal before driving the actuator to cause the nozzle to eject the liquid in a printing process, thereby increasing the temperature of the separation circuit.

6. The printing apparatus according to claim 1, wherein the controller is further configured to start a printing process after the temperature of the separation circuit is increased equal to or higher than a particular value when an image quality level required in the printing process is equal to or higher than a particular level.

7. The printing apparatus according to claim 1, wherein the controller is further configured to, when a liquid ejection frequency in a printing process is less than a particular frequency, cause the one or more switches to separate the second drive waveform signal from the time division multiplex signal, thereby increasing the temperature of the separation circuit.

8. The printing apparatus according to claim 1, wherein the multiplexing circuit is configured to generate the time division multiplex signal based on the first data, the second data, and third data, the time division multiplex signal enabling the first data, the second data, and the third data to be transmitted via the single signal line, the third data representing a third drive waveform different from the first drive waveform and the second drive waveform, the third drive waveform having a fifth section and a sixth section, the time division multiplex signal being generated with the first to sixth sections arranged in such a manner that the fifth section is between the second section and the third section, and the fourth section is between the second section and the sixth section, wherein the one or more switches are further configured to separate a third drive waveform signal from the time division multiplex signal based on a synchronization signal, the third drive waveform signal indicating the third drive waveform, and wherein the controller is configured to cause the one or more switches to separate the third drive waveform signal from the time division multiplex signal, and drive the actuator without causing the nozzle to eject the liquid based on the third drive waveform signal, thereby increasing the temperature of the separation circuit.

9. The printing apparatus according to claim 8, wherein the controller is further configured to:

determine which of the second drive waveform and the third drive waveform is to be separated from the time division multiplex signal depending on whether the liquid to be ejected from the nozzle has first properties or second properties;

when the liquid to be ejected from the nozzle has the first properties, cause the one or more switches to separate the second drive waveform signal from the time division multiplex signal; and when the liquid to be ejected from the nozzle has the second properties, cause the one or more switches to separate the third drive waveform signal from the time division multiplex signal.

10. The printing apparatus according to claim 8, wherein the print head has a nozzle surface in which a plurality of the nozzles open, the nozzle surface includes a first area, and a second area that is closer to a center of the nozzle surface in a first direction and a second direction than the first area is, the first direction being parallel to the nozzle surface, the second direction being perpendicular to the first direction and parallel to the nozzle surface, and wherein the controller is further configured to:

determine which of the second drive waveform and the third drive waveform is to be separated from the time division multiplex signal depending on whether a target one of the plurality of nozzles is located in the first area or the second area;

when the target nozzle is in the first area, cause the one or more switches to separate the second drive waveform signal from the time division multiplex signal; and when the target nozzle is in the second area, cause the one or more switches to separate the third drive waveform signal from the time division multiplex signal.

11. The printing apparatus according to claim 1, wherein the liquid is either a specific ink or a non-specific ink, and wherein the controller is further configured to, when the liquid to be ejected from the nozzle is the non-specific ink, cause the one or more switches to separate the second drive waveform signal from the time division multiplex signal, thereby increasing the temperature of the separation circuit.

12. The printing apparatus according to claim 11, wherein the specific ink contains resin particles in a ratio of 1 mass % (inclusive) to 10 mass % (inclusive).

13. The printing apparatus according to claim 11, wherein the specific ink contains an organic solvent having a saturated vapor pressure of 0.03 hPa or higher at 20° C. in a ratio of 10 mass % (inclusive) to 30 mass % (inclusive).

14. The printing apparatus according to claim 11, wherein the specific ink contains a colorant solid content in a ratio of 2 mass % (inclusive) to 10 mass % (inclusive).

15. The printing apparatus according to claim 11, wherein the specific ink contains pigment particles having an average particle size equal to or greater than 150 nm.

16. The printing apparatus according to claim 11, wherein the specific ink contains water in a ratio of 60 mass % or less.

17. The printing apparatus according to claim 1, wherein the controller is further configured to determine a temperature increase degree of the separation circuit according to properties of the liquid to be ejected from the nozzle, the temperature increase degree representing how much the temperature of the separation circuit is to be increased.

18. The printing apparatus according to claim 1, further comprising:

a liquid chamber configured to store the liquid; and a circulation pump configured to deliver the liquid from the liquid chamber to the nozzle, liquid that has not been ejected from the nozzle flowing into the liquid chamber via a circulation path.

19. A method implementable on a controller of a printing apparatus, the printing apparatus comprising a print head including a nozzle and an actuator, a multiplexing circuit, and a separation circuit including one or more switches, the method comprising:

causing the one or more switches to separate a first drive waveform signal from a time division multiplex signal generated by the multiplexing circuit, and drive the actuator to cause the nozzle to eject liquid based on the first drive waveform signal; and causing the one or more switches to separate a second drive waveform signal from the time division multiplex signal, and drive the actuator without causing the nozzle to eject the liquid based on the second drive waveform signal, thereby increasing a temperature of the separation circuit, wherein the multiplexing circuit is configured to generate the time division multiplex signal based on first data and second data, the time division multiplex signal enabling the first data and the second data to be transmitted via a single signal line, the first data representing a first drive waveform, the first drive waveform having a first section and a second section, the second data representing a second drive waveform different from the first drive waveform, the second drive waveform having a third section and a fourth section, the time division multiplex signal being generated with the first to fourth sections arranged in such a manner that the third section is between the first section and the second section, and the second section is between the third section and the fourth section, and wherein the separation circuit is configured to receive the time division multiplex signal from the multiplexing circuit, the separation circuit including the one or more switches configured to separate the first drive waveform signal or the second drive waveform signal from the time division multiplex signal based on a synchronization signal, the first drive waveform signal indicating the first drive waveform, the second drive waveform signal indicating the second drive waveform.

20. A non-transitory computer-readable storage medium storing computer-readable instructions that are executable by a controller of a printing apparatus, the printing apparatus comprising a print head including a nozzle and an actuator, a multiplexing circuit, and a separation circuit including one or more switches, the instructions being configured to, when executed by the controller, cause the printing apparatus to:

cause the one or more switches to separate a first drive waveform signal from a time division multiplex signal generated by the multiplexing circuit, and drive the actuator to cause the nozzle to eject liquid based on the first drive waveform signal; and cause the one or more switches to separate a second drive waveform signal from the time division multiplex signal, and drive the actuator without causing the nozzle to eject the liquid based on the second drive waveform signal, thereby increasing a temperature of the separation circuit, wherein the multiplexing circuit is configured to generate the time division multiplex signal based on first data and second data, the time division multiplex signal enabling the first data and the second data to be transmitted via a single signal line, the first data representing a first drive waveform, the first drive waveform having a first section and a second section, the second data representing a second drive waveform different from the first drive waveform, the second drive waveform having a third section and a fourth section, the time division multiplex signal being generated with the first to fourth sections arranged in such a manner that the third section is between the first section and the second section, and the second section is between the third section and the fourth section, and wherein the separation circuit is configured to receive the time division multiplex signal from the multiplexing circuit, the separation circuit including the one or more switches configured to separate the first drive waveform signal or the second drive waveform signal from the time division multiplex signal based on a synchronization signal, the first drive waveform signal indicating the first drive waveform, the second drive waveform signal indicating the second drive waveform.

* * * * *